US011541532B2

(12) United States Patent
Yoshino et al.

(10) Patent No.: US 11,541,532 B2
(45) Date of Patent: Jan. 3, 2023

(54) CARRYING DEVICE, ROBOT SYSTEM, PRODUCTION SYSTEM AND CONTROL METHOD

(71) Applicant: KABUSHIKI KAISHA YASKAWA DENKI, Kitakyushu (JP)

(72) Inventors: Katsuhiko Yoshino, Kitakyushu (JP); Naoyuki Ohtsubo, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 303 days.

(21) Appl. No.: 16/845,463

(22) Filed: Apr. 10, 2020

(65) Prior Publication Data

US 2020/0324404 A1    Oct. 15, 2020

(30) Foreign Application Priority Data

Apr. 12, 2019    (JP) .............................. JP2019-076384

(51) Int. Cl.
*B25J 9/00* (2006.01)
*B25J 11/00* (2006.01)
(Continued)

(52) U.S. Cl.
CPC ......... *B25J 9/0096* (2013.01); *B05B 13/0242* (2013.01); *B05B 13/0431* (2013.01);
(Continued)

(58) Field of Classification Search
CPC ... B25J 9/0096; B25J 9/046; B25J 9/06; B25J 9/1682; B25J 11/0075; B05B 13/0242; B05B 13/0431
See application file for complete search history.

(56) References Cited

U.S. PATENT DOCUMENTS 5,271,953 A * 12/1993 Litteral ............... H05K 3/0091
118/704
9,662,785 B2 * 5/2017 Schultz ............. B23K 37/0211
(Continued)

FOREIGN PATENT DOCUMENTS

JP        5-170328 A    7/1993
JP    2013-141732 A    7/2013
(Continued)

OTHER PUBLICATIONS

Office Action dated Jan. 5, 2021 in corresponding Japanese Patent Application No. 2019-076384 (with English Translation), 13 pages.

*Primary Examiner* — Kira Nguyen
(74) *Attorney, Agent, or Firm* — Oblon, McClelland, Maier & Neustadt, L.L.P.

(57) ABSTRACT

A carrying device includes a swivel that swivels around a central axis line of a revolution orbit that passes through a workpiece transfer area and a workpiece work area for a workpiece to be worked on by a robot, multiple workpiece holders positioned on the swivel such that when a first one of the workpiece holders is positioned in the workpiece transfer area, a second one of the workpiece holders is positioned in the workpiece work area, a revolution driver that causes the swivel to swivel around the central axis line of the revolution orbit, and a tilting driver that tilts each of the workpiece holders with respect to the central axis line of the revolution orbit.

20 Claims, 14 Drawing Sheets

(51) Int. Cl.
*B25J 9/04* (2006.01)
*B05B 13/02* (2006.01)
*B25J 9/16* (2006.01)
*B05B 13/04* (2006.01)
*B25J 9/06* (2006.01)

(52) U.S. Cl.
CPC ............... *B25J 9/046* (2013.01); *B25J 9/06* (2013.01); *B25J 9/1682* (2013.01); *B25J 11/0075* (2013.01)

(56) References Cited

U.S. PATENT DOCUMENTS

| | | | |
|---|---|---|---|
| 2012/0239184 A1* | 9/2012 | Cho | B25J 18/02 700/228 |
| 2013/0177370 A1* | 7/2013 | Yoshino | B25J 9/0096 414/223.01 |
| 2013/0259611 A1* | 10/2013 | Yoshino | B05B 13/0431 414/223.01 |
| 2015/0090769 A1 | 4/2015 | Furuta et al. | |
| 2018/0169853 A1* | 6/2018 | Niedermeier | B25J 9/0096 |
| 2019/0126377 A1* | 5/2019 | Gartner | B25J 11/005 |
| 2019/0193951 A1* | 6/2019 | Iwasaki | B65G 47/905 |
| 2020/0030995 A1* | 1/2020 | Lu | B25J 9/0036 |

FOREIGN PATENT DOCUMENTS

| | | |
|---|---|---|
| JP | 2013-212562 A | 10/2013 |
| JP | 2017-007053 A | 1/2017 |
| JP | 2017-043477 A | 3/2017 |
| WO | WO 2014/049637 A1 | 4/2014 |

\* cited by examiner

CARRYING DEVICE, ROBOT SYSTEM, PRODUCTION SYSTEM AND CONTROL METHOD

CROSS-REFERENCE TO RELATED APPLICATIONS

The present application is based upon and claims the benefit of priority to Japanese Patent Application No. 2019-076384, filed Apr. 12, 2019, the entire contents of which are incorporated herein by reference.

BACKGROUND OF THE INVENTION

Field of the Invention

The present disclosure relates to a carrying device, a robot system, a production system and a control method.

Description of Background Art

Japanese Patent Application Laid-Open Publication No. 2013-141732 describes a carrying device that includes a base that is provided on a ground contact surface, a swivel arm that is provided on the base in a manner capable of freely swiveling such that turn tables attached to both ends thereof pass through a carrying in and out position and a work position which are preset on a circular orbit, and a swivel mechanism that causes the swivel arm to swivel such that the turn tables revolve around the base. The entire contents of this publication are incorporated herein by reference.

SUMMARY OF THE INVENTION

According to one aspect of the present invention, a carrying device includes a swivel that swivels around a central axis line of a revolution orbit that passes through a workpiece transfer area and a workpiece work area for a workpiece to be worked on by a robot, multiple workpiece holders positioned on the swivel such that when a first one of the workpiece holders is positioned in the workpiece transfer area, a second one of the workpiece holders is positioned in the workpiece work area, a revolution driver that causes the swivel to swivel around the central axis line of the revolution orbit, and a tilting driver that tilts each of the workpiece holders with respect to the central axis line of the revolution orbit.

According to another aspect of the present invention, a control method is implemented by a carrying device including a swivel that swivels around a central axis line of a revolution orbit that passes through a workpiece transfer area and a workpiece work area for a workpiece to be worked on by a robot, and multiple workpiece holders positioned on the swivel such that when a first one of the workpiece holders is positioned in the workpiece transfer area, a second one of the workpiece holders is positioned in the workpiece work area. The control method includes causing a revolution driver to swivel the swivel such that the workpiece holders move between the workpiece transfer area and the workpiece work area, causing the robot to perform work with respect to the workpiece held by one of the workpiece holders in the workpiece work area, and during a time period when the robot performs the work with respect to the workpiece held by the one of the workpiece holders, causing a tilting driver to tilt the one of the workpiece holders with respect to the central axis line of the revolution orbit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
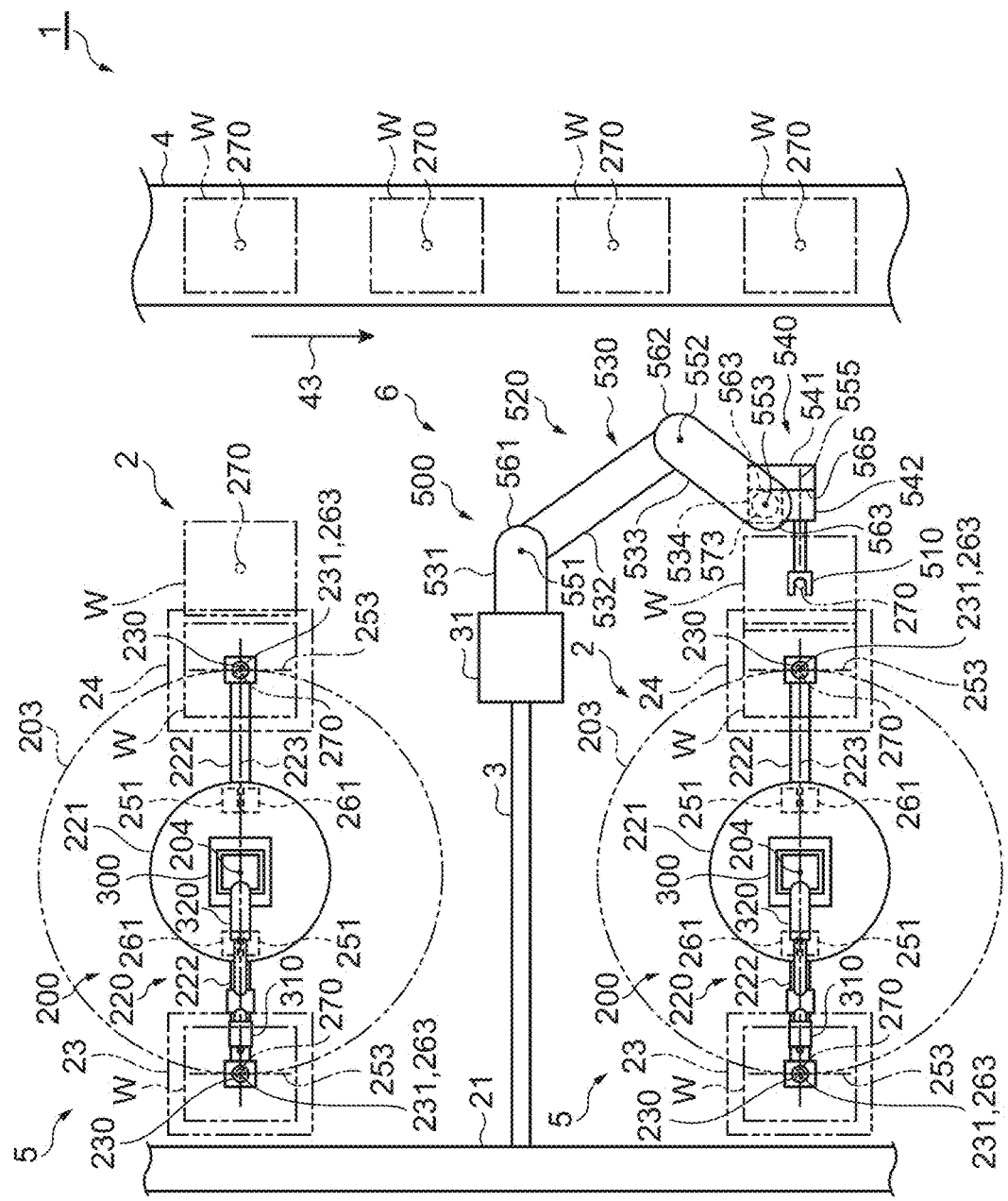
FIG. 1 is a plan view illustrating a schematic structure of a production system.

Embodiments will now be described with reference to the accompanying drawings, wherein like reference numerals designate corresponding or identical elements throughout the various drawings.

Production System

Figure 2:
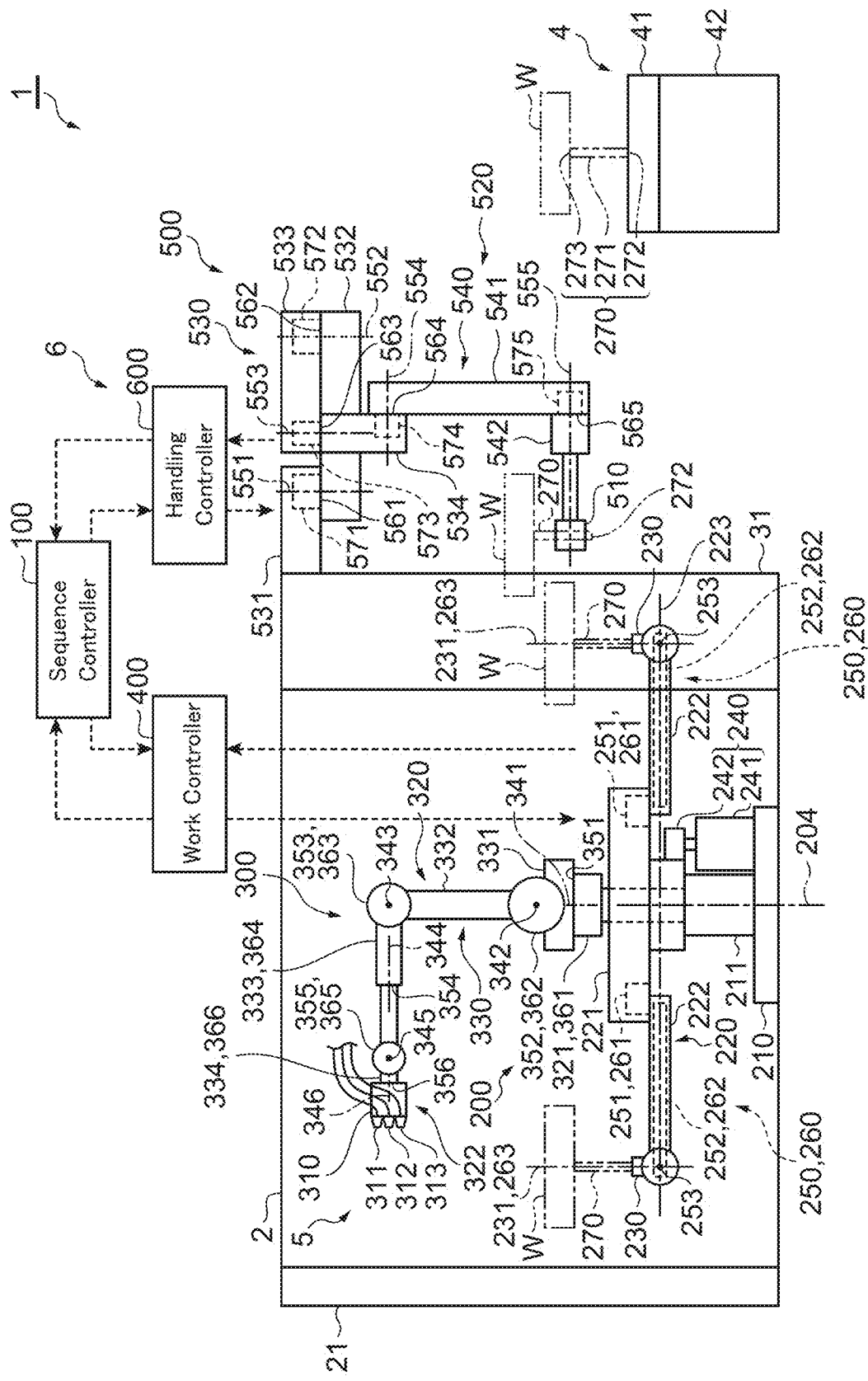
FIG. 2 is a side view of the production system of FIG. 1.

A production system 1 illustrated in FIGS. 1 and 2 is a system that performs predetermined works with respect to workpieces in a product production line. These specific examples are merely examples. Although there are no particular restrictions on products, workpieces and works, in the following, a system that performs a painting work with respect to a body part for an automobile in an automobile production line is specifically illustrated as an example.

As illustrated in FIGS. 1 and 2, the production system 1 includes a conveyor 4, multiple work cells 2, multiple work robot systems 5 (robot systems), at least one handling robot system 6, and a sequence controller 100.

The conveyor 4 carries a workpiece (W) along a predetermined carrying direction 43. For example, the conveyor 4 has a support part 41 that supports the workpiece (W), and a carrying drive part 42 that moves the support part 41 along the carrying direction 43. A specific example of the carrying drive part 42 is an electric drive part that moves the support part 41 using an electric motor as a power source.

The multiple work cells 2 are arranged along the carrying direction 43 on one side of the conveyor 4. Adjacent work cells 2 are separated by a partition wall 3. The work cells 2 are open towards the conveyor 4. An adsorption wall 21 that adsorbs a coating material for painting is provided in the back (as viewed from the conveyor 4) of each of the work cells 2. The work cells 2 may each be formed such that a water curtain is formed on an inner surface of the adsorption wall 21.

The work cells 2 each have a work area 23 and a transfer area 24. The work area 23 is an area where a workpiece (W) to be worked is arranged when a painting work is performed, and the transfer area 24 is an area for transferring a workpiece (W) to be worked. For example, the work area 23 is positioned closer to the adsorption wall 21 in each of the work cells 2, and the transfer area 24 is positioned closer to the conveyor 4 in each of the work cells 2.

The multiple work robot systems 5 are respectively provided in the multiple work cells 2, and each perform a painting work with respect to a workpiece (W). The work robot systems 5 each include an in-cell carrying device 200 (carrying device), a work robot 300 (robot), and a work controller 400. The in-cell carrying device 200 carries a workpiece (W) along a circular revolution orbit 203 that passes through the work area 23 and the transfer area 24. A central axis line 204 of revolution orbit 203 may be vertical or inclined with respect to a vertical direction.

The in-cell carrying device 200 has a base part 210, a swivel part 220, multiple workpiece holding parts 230, a revolution driving part 240, a tilting driving part 250, and a rotation driving part 260. The base part 210 is fixed to the central axis line 204 and has a fixed shaft 211 protruding upward (for example, vertically upward). The swivel part 220 is provided so as to be capable of swiveling around the central axis line 204 of the revolution orbit 203.

The multiple workpiece holding parts 230 each hold a workpiece (W). The multiple workpiece holding parts 230 are provided on the swivel part 220 such that when one of the workpiece holding parts 230 is positioned in the transfer area 24, another one of the workpiece holding parts 230 is positioned in the work area 23.

As an example, the work area 23 and the transfer area 24 are positioned opposite to each other around the central axis line 204 of the revolution orbit 203. Accordingly, the in-cell carrying device 200 has two workpiece holding parts 230, and when any one of the two workpiece holding parts 230 is positioned in the transfer area 24, the other one of the workpiece holding parts 230 is positioned in the work area 23.

The swivel part 220 has a main body part 221 and two swivel arms 222. The main body 221 is attached to an outer periphery of the fixed shaft 211 so as to be capable of swiveling around the central axis line 204. The two swivel arms 222 protrude from outer periphery of the main body part 221 in mutually opposite directions, and the two workpiece holding parts 230 are respectively provided at end parts of the two swivel arms 222. The workpiece holding parts 230 respectively protrude upward from the end parts of the swivel arms 222. The workpiece holding parts 230 each support a workpiece (W) from below and hold the workpiece (W), for example, by vacuum suction or by gripping with a mechanical hand.

The number of the workpiece holding parts 230 is not necessarily limited to two. The in-cell carrying device 200 may have three or more workpiece holding parts 230 as long as a condition is satisfied that, when any one of the workpiece holding parts 230 is positioned in the transfer area 24, another one of the workpiece holding parts 230 is positioned in the work area 23.

The revolution driving part 240 causes the swivel part 220 to swivel around the central axis line 204 of the revolution orbit 203. For example, the revolution driving part 240 has an electric motor 241 and a transmission part 242 that transmits power of the motor 241 to the main body part 221.

The tilting driving part 250 causes each of the multiple workpiece holding parts 230 to be tilted with respect to the central axis line 204 of the revolution orbit 203. Here, causing a workpiece holding part 230 to be tilted with respect to the central axis line 204 means changing an angle between a predetermined axis line fixed to the workpiece holding part 230 and the central axis line 204. As an example, the tilting driving part 250 changes an angle between a central axis line 231 of a workpiece holding part 230 (a central axis line along the protruding direction of the workpiece holding part 230 from the swivel arm 222) and the central axis line 204.

For example, the tilting driving part 250 causes each of the multiple workpiece holding parts 230 to be tilted around a tilting axis line 253 perpendicular to the central axis line 204. Here, the term "perpendicular" includes a case of a skewed relationship such as a three-dimensional intersection. As an example, the tilting driving part 250 causes a workpiece holding part 230 to be tilted around a tilting axis line 253 that is perpendicular to a vertical virtual plane containing the central axis line 204 and the central axis line 231 of the workpiece holding part 230 and that passes through a base part (a part connecting to the swivel arm 222) of the workpiece holding part 230. In other words, the tilting driving part 250 causes a workpiece holding part 230 to be tilted around the tilting axis line 253 that is perpendicular to the central axis line 204 and a central axis line 223 of the swivel arm 222 and that passes through the base part (the part connecting to the swivel arm 222) of the workpiece holding part 230. The tilting driving part 250 may be structured to cause a workpiece holding part 230 to be tilted around a tilting axis line 253 that is perpendicular to the central axis line 204 and is along the central axis line 223 of the swivel arm 222.

The tilting driving part 250 may also be structured so as to be capable of individually causing each of the multiple workpiece holding parts 230 to be tilted. For example, the tilting driving part 250 may have, for each of the workpiece holding parts 230, an electric motor 251 and a transmission part 252 that transmits power of the motor 251 to the each of the workpiece holding parts 230. The motor 251 may be built in the main body part 221, and the transmission part 252 may be built in the swivel arm 222. The transmission part 252 can be formed by appropriately combining transmission elements such as a bevel gear, a transmission shaft, and a timing belt.

The rotation driving part 260 causes each of the multiple workpiece holding parts 230 to rotate around a rotation axis line 263 perpendicular to the tilting axis line 253. Here, the rotation of an object means a rotation around an axis line that passes through the object and is fixed to the object. Therefore, the rotation axis line 263 tilts together with the workpiece holding part 230 according to the tilting of the workpiece holding part 230 caused by the tilting driving part 250. As an example, the rotation driving part 260 causes each of the workpiece holding parts 230 to rotate around its central axis line 231.

The rotation driving part 260 may also be structured so as to be capable of individually causing each of the multiple workpiece holding parts 230 to rotate. For example, the rotation driving part 260 may have, for each of the workpiece holding parts 230, an electric motor 261 and a transmission part 262 that transmits power of the motor 261 to the each of the workpiece holding pans 230. The motor 261 may be built in the main body part 221, and the transmission part 262 may be built in the swivel arm 222. The transmission part 262 can be formed by appropriately combining transmission elements such as a bevel gear, a transmission shaft, and a timing belt.

The workpiece holding parts 230 may each hold a workpiece (W) via a support jig 270. For example, the support jig 270 has a base part 272 held by the each of the workpiece holding parts 230, a support post 271 protruding upward from the base part 272, and a workpiece holding part 273 that holds a workpiece (W) at an end part of the support post 271.

Transfer of a workpiece (W) between the conveyor 4 and each of the work cells 2 is performed with a support jig 270 attached. Also in the conveyor 4, the base part 272 of the support jig 270 is held such that the support post 271 protrudes upward. As a result, a workpiece (W) is kept in a levitated state both on the conveyor 4 and in each of the work cells 2.

The work robot 300 performs a preset work (for example, a painting work) with respect to a workpiece (W) held by a workpiece holding part 230 positioned in the work area 23. For example, the work robot 300 has a painting tool 310 that discharges a coating material and a multi-joint work arm 320 that changes a position and a posture of the painting tool 310.

The painting tool 310 is formed so as to discharge a coating material in a form of a mist. The painting tool 310 may also be formed to individually discharge multiple types of coating materials. For example, the painting tool 310 has multiple (for example, three) discharge nozzles (311, 312, 313) that respectively discharge multiple types (for example, three types) of coating materials. As an example, the discharge nozzles (311, 312, 313) are respectively connected to three types of coating material supply sources (not illustrated in the drawings). For example, the discharge nozzle 311 discharges a coating material for base coating. The discharge nozzle 312 discharges a coating material for main coating. The discharge nozzle 313 discharges a coating material for clear coating.

The work arm 320 is a serial link type vertical multi-joint robot, and has a base part 321, a front end part 322, and a multi-joint arm 330. The base part 321 is fixed to an end part of the fixed shaft 211 above the swivel part 220 described above. The front end part 322 holds the painting tool 310. The multi-joint arm 330 connects the base part 321 to the front end part 322.

The multi-joint arm 330 has multiple joints sequentially arranged from the base part 321 to the front end part 322. By changing angles of the multiple joints, the multi-joint arm 330 changes a position and a posture of the front end part 322 with respect to the base part 321. For example, the multi-joint arm 330 has a swivel part 331, a lower arm 332, an upper arm 333, a wrist part 334, and motors (361, 362, 363, 364, 365, 366).

The swivel part 331 is provided on an upper part of the base part 321 so as to be capable of swiveling around a vertical axis line 341. That is, the multi-joint arm 330 has a joint 351 that allows the swivel part 331 to swivel around the axis line 341.

The lower arm 332 is connected to the swivel part 331 so as to be swingable around an axis line 342 perpendicular to the axis line 341. That is, the multi-joint arm 330 has a joint 352 that allows the lower arm 332 to swing around the axis line 342. Here, the term "perpendicular" also includes a case of a skewed relationship such as a three-dimensional intersection. The same applies to the following.

The upper arm 333 is connected to an end part of the lower arm 332 so as to be swingable around an axis line 343 perpendicular to the axis line 341. That is, the multi-joint arm 330 has a joint 353 that allows the upper arm 333 to swing around the axis line 343. The axis line 343 may be parallel to the axis line 342.

A front end part of the upper arm 333 is capable of swiveling around an axis line 344 along a center of the upper arm 333. That is, the multi-joint arm 330 has a joint 354 that allows the front end part of the upper arm 333 to swivel around the axis line 344.

The wrist part 334 is connected to the front end part of the upper arm 333 so as to be swingable around an axis line 345 perpendicular to the axis line 344. That is, the multi-joint arm 330 has a joint 355 that allows the wrist part 334 to swing around the axis line 345.

The front end part 322 is connected to an end part of the wrist part 334 so as to be capable of swiveling around an axis line 346 along a center of the wrist part 334. That is, the multi-joint arm 330 has a joint 356 that allows the front end part 322 to swivel around the axis line 346.

The motors (361, 362, 363, 364, 365, 366) respectively drive the multiple movable parts of the multi-joint arm 330 in accordance with power supply. For example, the motor 361 causes the swivel part 331 to swivel around the axis line 341; the motor 362 causes the lower arm 332 to swing around the axis line 342; the motor 363 causes the upper arm 333 to swing around the axis line 343; the motor 364 causes the front end part of the upper arm 333 to swivel around the axis line 344; the motor 365 causes the wrist part 334 to swing around the axis line 345; and the motor 366 causes the front end part 322 to swivel around the axis line 346. That is, the motors (361, 362, 363, 364, 365, 366) respectively drive the joints (351, 352, 353, 354, 355, 356).

The above-described structure of the work arm 320 is merely an example. The work arm 320 can be structured in any way as long as the position and the posture of the painting tool 310 can be changed within desired ranges. For example, the work arm 320 may be a 7-axis vertical multi-joint robot formed by adding a redundant axis to the above-described 6-axis vertical multi-joint robot. Further, the work arm 320 may be a so-called scalar type robot or a parallel link type robot.

The work controller 400 is structured to execute the following: causing the revolution driving part 240 to swivel the swivel part 220 so as to move the workpiece holding parts 230 between the transfer area 24 and the work area 23; causing the work robot 300 to perform a preset work with respect to a workpiece (W) held by a workpiece holding part 230 arranged in the work area 23; and, during a time period when the work robot 300 performs a work with respect to a workpiece (W) held by a workpiece holding part 230, causing the tilting driving part 250 to tilt the workpiece holding part 230 with respect to the central axis line 204 of the revolution orbit 203.

The work controller 400 may be structured to further execute the following: during at least a portion of a time period when the revolution driving part 240 swivels the swivel part 220, causing at least one (for example, all) of the workpiece holding parts 230 to be tilted toward the central axis line 204 side of the revolution orbit 203 by tilting by the tilting driving part 250.

Figure 3:
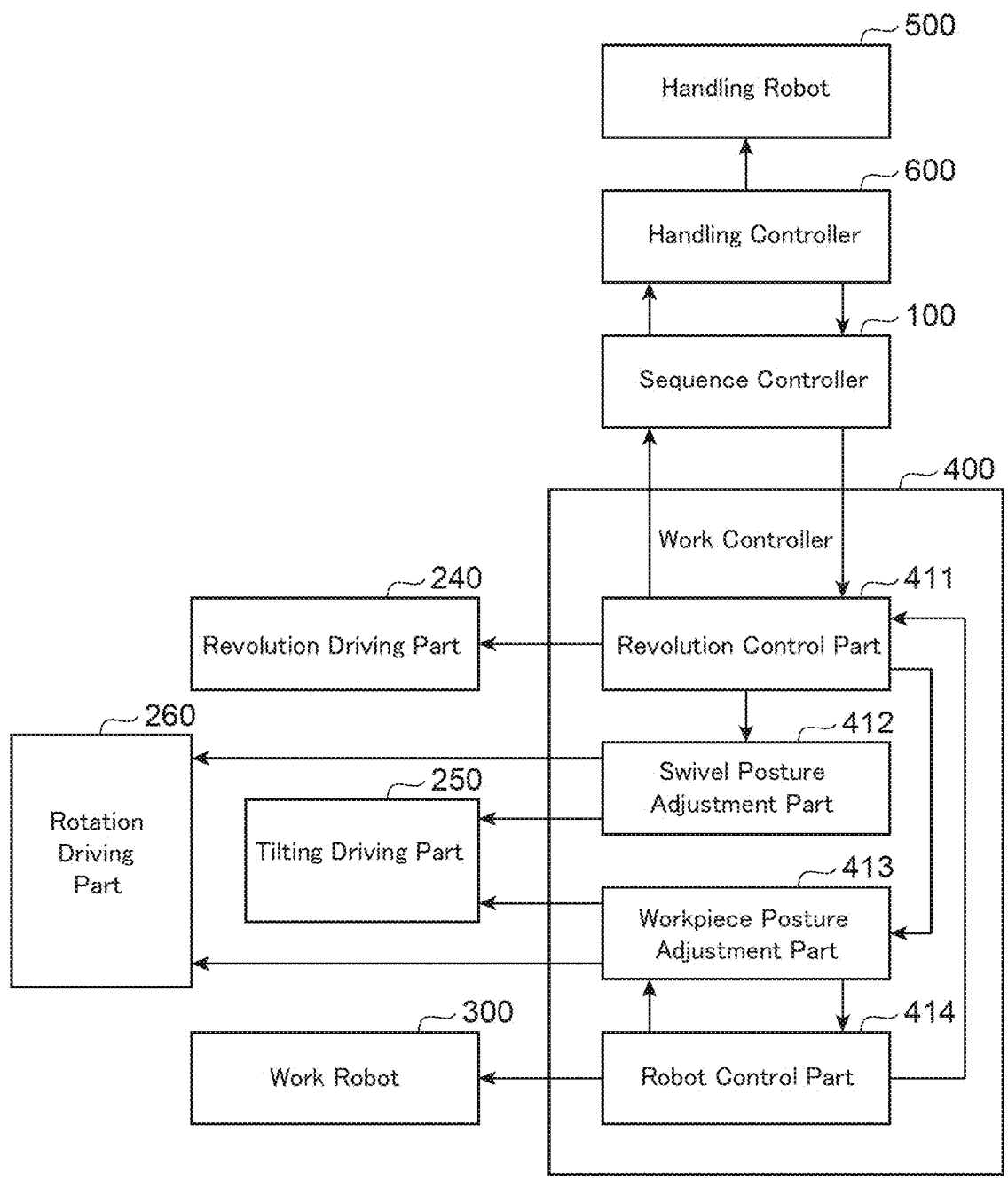
FIG. 3 is a block diagram illustrating a circuit structure that is functionally equivalent to a work controller.

FIG. 3 is a block diagram illustrating a circuit structure that is functionally equivalent to the work controller. As illustrated in FIG. 3, as a functional structure (hereinafter, referred to as "functional blocks"), the work controller 400 includes a revolution control part 411, a swivel posture adjustment part 412, a robot control part 414, and a workpiece posture adjustment part 413.

The revolution control part 411 causes the revolution driving part 240 to swivel the swivel part 220 so as to move the workpiece holding parts 230 between the transfer area 24 and the work area 23. When the work area 23 and the transfer area 24 are positioned opposite to each other around the central axis line 204 of the revolution orbit 203 and the in-cell carrying device 200 has two workpiece holding parts 230, the revolution control part 411 causes the revolution driving part 240 to reverse the swivel part 220 by 180 degrees so that the workpiece holding parts 230 are interchanged with each other between the transfer area 24 and the work area 23.

During at least a portion of a time period when the tilting driving part 250 swivels the swivel part 220, the swivel posture adjustment part 412 causes all the workpiece holding parts 230 to be tilted toward the central axis line 204 side of the revolution orbit 203 by tilting by the revolution driving part 240.

Figure 4:
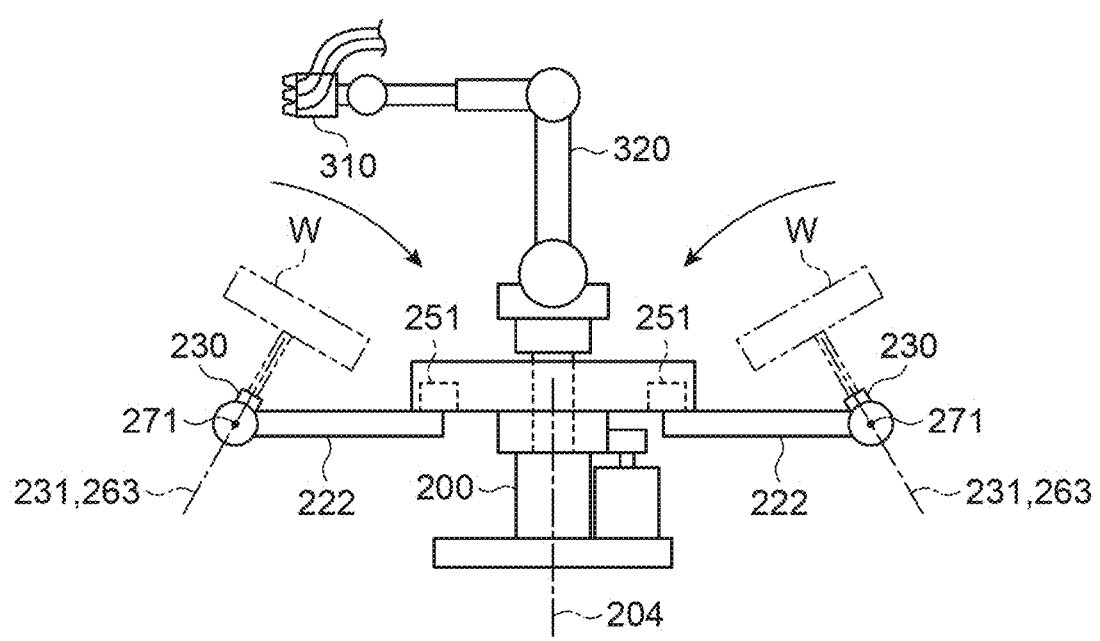
FIG. 4 is a schematic diagram illustrating a posture change before reversion.

Here, causing a workpiece holding part 230 to be tilted toward the central axis line 204 side means that the workpiece holding part 230 is tilted so as to be closer to the central axis line 204 with increasing distance from the swivel arm 222. In other words, causing a workpiece holding part 230 to be tilted toward the central axis line 204 means that the protruding direction of the workpiece holding part 230 from the swivel arm 222 is inclined toward the central axis line 204 side rather than being parallel to the central axis line 204 (see FIG. 4).

Figure 5A:
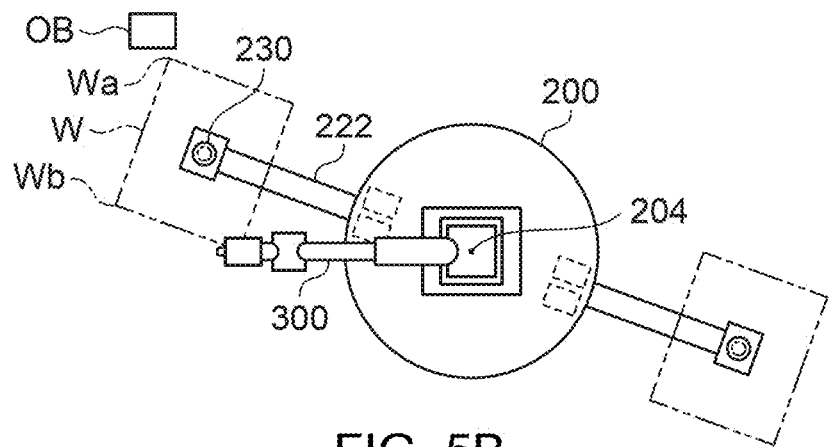
FIGS. 5A-5C are schematic diagrams illustrating posture changes during the reversion.

During at least a portion of a time period when the revolution driving part 240 swivels the swivel part 220, the swivel posture adjustment part 412 may change a posture of a workpiece (W) so as to avoid an obstacle by rotating a workpiece holding part 230 by the rotation driving part 260. For example, in FIG. 5A, when the swivel part 220 rotates clockwise, an edge (Wa) of a workpiece (W) collides with an obstacle (OB). In this case, the swivel posture adjustment part 412 may cause the rotation driving part 260 to rotate the workpiece holding part 230 so that the edge (Wa) approaches the central axis line 204. As a result, as illustrated in FIG. 5B, a collision between the edge (Wa) and the obstacle (OB) is avoided.

Figure 5B:
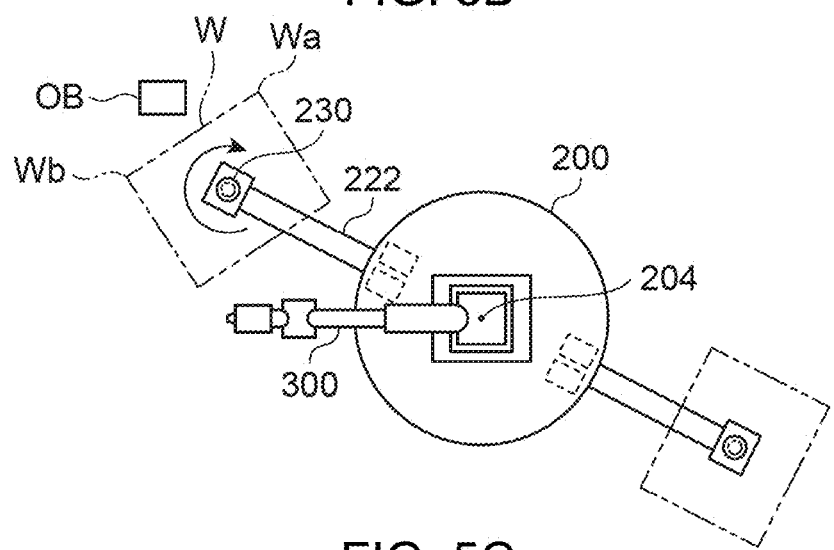
Figure 5C:
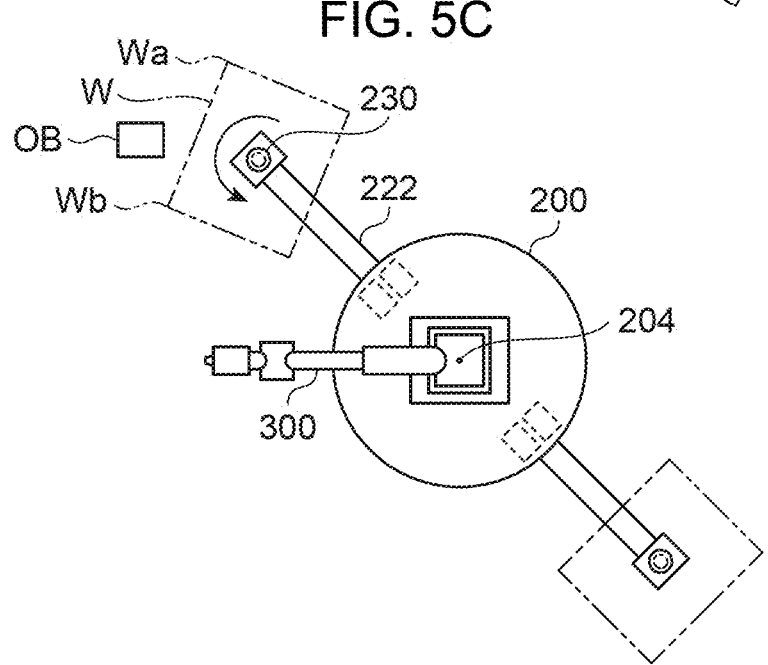

In FIG. 5B, when the swivel part 220 further rotates clockwise, an edge (Wb) of the workpiece (W) collides with the obstacle (OB). In this case, the swivel posture adjustment part 412 may cause the rotation driving part 260 to rotate the workpiece holding part 230 so that the edge (Wb) approaches the central axis line 204. As a result, as illustrated in FIG. 5C, a collision between the edge (Wb) and the obstacle (OB) is avoided.

The robot control part 414 causes the work robot 300 to perform a preset work with respect to a workpiece (W) held by the workpiece holding part 230 positioned in the work area 23. For example, the robot control part 414 causes the work arm 320 to move the painting tool 310 without pointing the painting tool 310 toward the base part 321 of the work arm 320.

Here, pointing the painting tool 310 toward the base part 321 means that a discharge direction of the discharge nozzles (311, 312, 313) is inclined toward the base part 321 side (side of a vertical line passing through the base part 321) rather than being a vertical direction. A movement pattern of the painting tool 310 by the work arm 320 is, for example, set in advance for each of multiple painting target areas formed by dividing a painting target surface of a workpiece (W).

During a time period when a workpiece holding part 230 performs a work with respect to a workpiece (W) held by the workpiece holding part 230, the workpiece posture adjustment part 413 changes the posture of the workpiece (W) by tilting the workpiece holding part 230 by the tilting driving part 250. It is also possible that, during a time period when the work robot 300 performs a work with respect to a workpiece (W) held by a work holding part 230, the workpiece posture adjustment part 413 changes the posture of the workpiece (W) by tilting the workpiece holding part 230 by the tilting driving part 250 and rotating the workpiece holding part 230 by the rotation driving part 260. For example, during a time period when the work robot 300 moves the painting tool 310, the workpiece posture adjustment part 413 causes a whole painting target surface of a workpiece (W) to face the painting tool 310 by tilting the workpiece holding part 230 by the tilting driving part 250 and rotating the workpiece holding part 230 by the rotation driving part 260.

Causing the painting target surface to face the painting tool 310 means that the painting target surface is caused to face a direction in which a coating material is discharged by the painting tool 310. Here, the term "facing" is not limited to "directly facing," but also includes a state in which the painting target surface is inclined with respect to the discharge direction of the discharge nozzles (311, 312, 313).

Figure 6A:
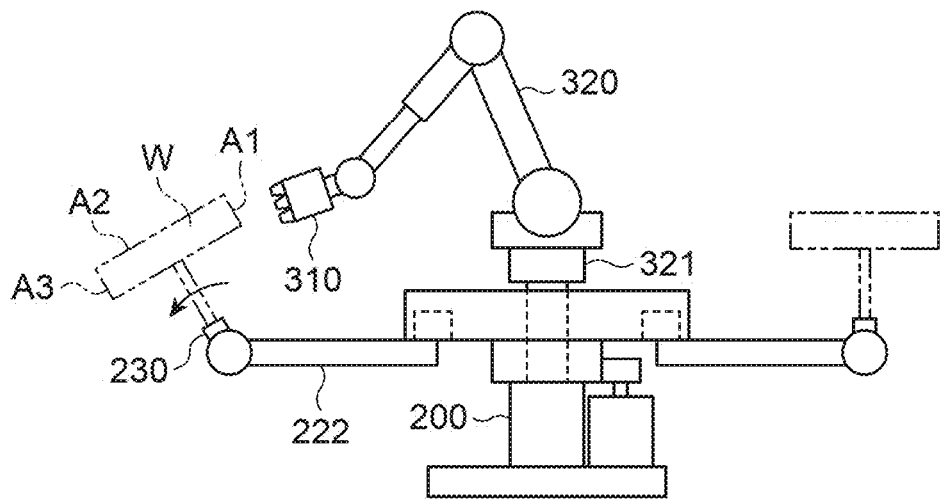
FIGS. 6A-6C are schematic diagrams illustrating posture changes during painting.
Figure 6B:
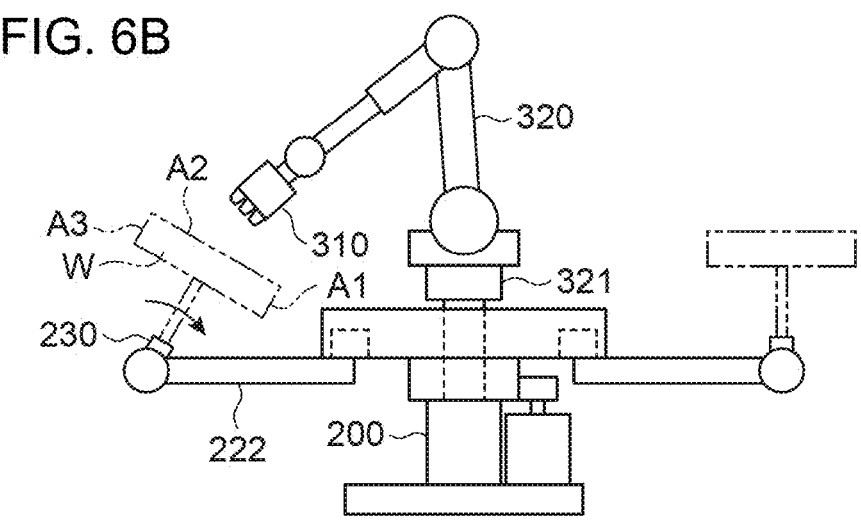
Figure 6C:
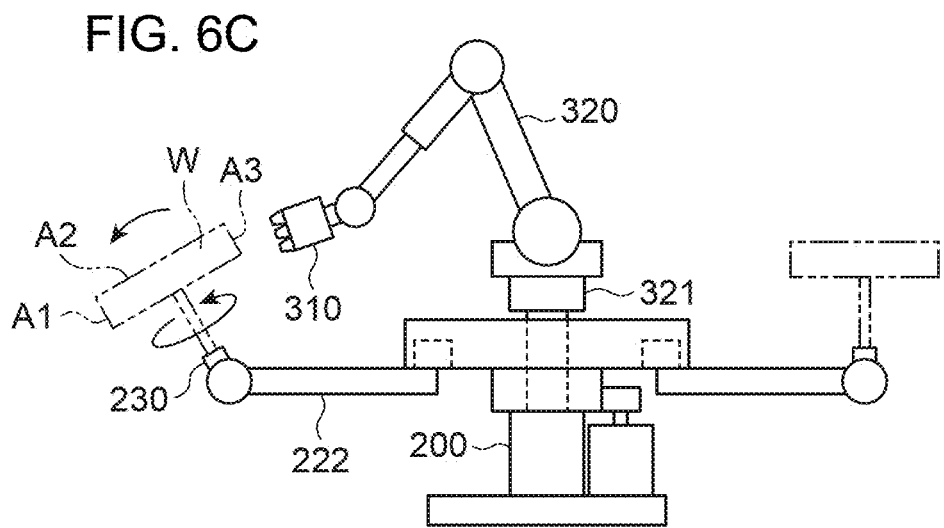

For example, the workpiece posture adjustment part 413 causes a painting target area corresponding to a movement pattern of the painting tool 310 described above to face the painting tool 310. For example, as illustrated in FIG. 6A, during a time period when the work arm 320 moves the painting tool 310 in a movement pattern corresponding to a painting target area (A1) of a workpiece (W), the workpiece posture adjustment part 413 causes the painting target area (A1) to face the painting tool 310. As illustrated in FIG. 6B, during a time period when the work arm 320 moves the painting tool 310 in a movement pattern corresponding to a painting target area (A2) of the workpiece (W), the workpiece posture adjustment part 413 causes the painting target area (A2) to face the painting tool 310. As illustrated in FIG. 6C, during a time period when the work arm 320 moves the painting tool 310 in a movement pattern corresponding to a painting target area (A3) of the workpiece (W), the workpiece posture adjustment part 413 causes the painting target area (A3) to face the painting tool 310.

Returning to FIGS. 1 and 2, the handling robot system 6 executes: carrying of a workpiece (W) from the conveyor 4 to a transfer area 24 (carrying of a workpiece (W) into a work cell 2); and carrying of a workpiece (W) from a transfer area 24 to the conveyor 4 (carrying out of a workpiece (W) from a work cell 2).

The handling robot system 6 has a handling robot 500 and a handling controller 600. The handling robot 500 carries a workpiece (W), and performs transfer of a workpiece (W) to or from a workpiece holding part 230 in a transfer area 24. For example, the handling robot 500 carries a workpiece (W) from the conveyor 4 to a transfer area 24, and transfers the workpiece (W) to a workpiece holding part 230 in the transfer area 24. Further, the handling robot 500 receives a workpiece (W) from a workpiece holding part 230 in a transfer area 24, and carries the workpiece (W) from the transfer area 24 to the conveyor 4.

For example, the handling robot 500 has a transfer holding part 510 and a handling arm 520. The transfer holding part 510 holds a workpiece (W) and performs transfer a workpiece (W) to or from a workpiece holding part 230. As an example, the transfer holding part 510 holds a support jig 270 above a base part 272. The transfer holding part 510 holds a workpiece (W), for example, by vacuum suction, gripping with a mechanical hand, or engagement between a claw and a groove.

The handling arm 520 is a serial link type multi-joint robot that moves the transfer holding part 510. A base part of the handling arm 520 may be installed above the in-cell carrying device 200.

The handling robot 500 may be installed such that the transfer holding part 510 can be arranged in transfer areas 24 of multiple work robot systems 5. For example, the handling robot 500 is provided between two work cells 2 so that the transfer holding part 510 can be arranged in the transfer areas 24 of the two work cells 2. For example, a support post 31 for installing a handling robot 500 is provided between two work cells 2. For example, the support post 31 is along an edge of the partition wall 3 on the conveyor 4 side.

The handling robot 500 has a first scalar arm 530 and a second scalar arm 540. The first scalar arm 530 is a scalar type multi-joint arm that moves a front end part thereof in a horizontal plane. For example, the first scalar arm 530 has a base part 531, a first horizontal arm 532, a second horizontal arm 533, a first end part 534, and motors (571, 572, 573).

The base part 531 protrudes from the support post 31 to the conveyor 4 side above the in-cell carrying device 200. A height of the base part 531 may be set such that the base part 531 is positioned above a maintenance worker's head. For example, a height from a floor surface to a lower surface of the base part 531 may be 1.8 m or more, or 2 m or more.

The first horizontal arm 532 is connected to an end part of the base part 531 so as to be swingable around a vertical axis line 551. That is, the first scalar arm 530 has a joint 561 that allows the first horizontal arm 532 to swing around the axis line 551. The first horizontal arm 532 extends from the end part of the base part 531 in a direction perpendicular to the axis line 551 (that is, in a horizontal direction).

The second horizontal arm 533 is connected to an end part of the first horizontal arm 532 so as to be swingable around a vertical axis line 552. That is, the first scalar arm 530 has a joint 562 that allows the second horizontal arm 533 to swing around the axis line 552. The second horizontal arm 533 extends from the end part of the first horizontal arm 532 in a direction perpendicular to the axis line 552 (that is, in a horizontal direction).

The first end part 534 is connected to an end part of the second horizontal arm 533 so as to be capable of swiveling around a vertical axis line 553. That is, the first scalar arm 530 has a joint 563 that allows the first end part 534 to swivel around the axis line 553. The first end part 534 protrudes downward from the end part of the second horizontal arm 533.

The motors (571, 572, 573) respectively drive the multiple movable parts of the first scalar arm 530 in accordance with power supply. For example, the motor 571 causes the first horizontal arm 532 to swing around the axis line 551; the motor 572 causes the second horizontal arm 533 to swing around the axis line 552; and the motor 573 causes the first end part 534 to swivel around the axis line 553. That is, the motors (571, 572, 573) respectively drive the joints (561, 562, 563). As a result, a position and a posture of the first end part 534 in a horizontal plane are changed.

The second scalar arm 540 is a scalar type multi-joint arm that is connected to the front end part of the first scalar arm 530 and moves the transfer holding part 510 in a vertical plane. The second scalar arm 540 has a vertical arm 541, a second end part 542, and motors (574, 575).

The vertical arm 541 is connected to a lower end part of the first end part 534 so as to be swingable around a horizontal axis line 554. That is, the second scalar arm 540 has a joint 564 that allows the vertical arm 541 to swing around the axis line 554. The vertical arm 541 extends from the lower end part of the first end part 534 in a direction perpendicular to the axis line 554.

The second end part 542 is connected to an end part of the vertical arm 541 so as to be capable of swiveling around an axis line 555 parallel to the axis line 554. That is, the second scalar arm 540 has a joint 565 that allows the second end part 542 to swivel around the axis line 555. The second end part 542 protrudes from the end part of the vertical arm 541 along the axis line 555, and the transfer holding part 510 is provided at an end part of the second end part 542.

The motors (574, 575) respectively drive the multiple movable parts of the second scalar arm 540 in accordance with power supply. For example, the motor 574 causes the vertical arm 541 to swing around the axis line 554; and The motor 575 causes the second end part 542 to swivel around the axis line 555. As a result, a position and a posture of the transfer holding part 510 in a vertical plane are changed.

The handling controller 600 causes the handling robot 500 to carry a workpiece (W) and to perform transfer of a workpiece (W) to or from a workpiece holding part 230 in a transfer area 24.

For example, the handling controller 600 causes the handling robot 500 to execute the following: causing the handling arm 520 to move the transfer holding part 510 to the conveyor 4 and causing the transfer holding part 510 to hold a support jig 270; causing the handling arm 520 to move the transfer holding part 510 holding the support jig 270 to a transfer area 24 and arrange the base part 272 of the support jig 270 in a workpiece holding part 230; and releasing the support jig 270 from the transfer holding part 510.

Further, the handling controller 600 causes the handling robot 500 to execute the following: causing the handling arm 520 to move the transfer holding part 510 to a transfer area 24 and causing the transfer holding part 510 to hold a support jig 270 held by a workpiece holding part 230; causing the handling arm 520 to move the transfer holding part 510 holding the support jig 270 to the conveyor 4; and releasing the support jig 270 from the transfer holding part 510.

When the handling robot 500 is installed such that the transfer holding part 510 can be arranged in transfer areas 24 of multiple work robot systems 5, the handling controller 600 (handling control part) may be structured to cause the handling robot 500 to carry the transfer holding part 510 to a transfer area 24 of any one of the work robot systems 5 and carry the transfer holding part 510 to a transfer area 24 of another one of the work robot systems 5 in different time periods.

The sequence controller 100 outputs various operation commands to the work controller 400 and the handling controller 600 so that the work robot systems 5 and the handling robot system 6 are coordinated. For example, for each of the multiple work robot systems 5, the sequence controller 100 acquires from the handling controller 600 information indicating a timing at which the handling robot 500 arranges the transfer holding part 510 in a transfer area 24, and outputs to the work controller 400 a command for arranging a workpiece holding part 230 for transfer of a workpiece (W) in the transfer area 24 in accordance with the timing.

It is also possible that, for each of the multiple work robot systems 5, the sequence controller 100 acquires from the work controller 400 information indication a timing at which a workpiece holding part 230 for transfer of a workpiece (W) is arranged in a transfer area 24, and outputs to the handling controller 600 a command for arranging the transfer holding part 510 in the transfer area 24 in accordance with the timing.

By any one of these, the revolution control part 411 of each of the work robot systems 5 causes the swivel part 220 to swivel so as to arrange a workpiece holding part 230 for transfer of a workpiece (W) in a transfer area 24 in accordance with the timing at which the handling robot 500 arranges the transfer holding part 510 in the transfer area 24.

Here, arranging a workpiece holding part 230 in a transfer area 24 in accordance with the timing at which the handling robot 500 arranges the transfer holding part 510 in the transfer area 24 means that the workpiece holding part 230 is arranged in the transfer area 24 at a timing at which a time period when the transfer holding part 510 is arranged in the transfer area 24 and a time period when the workpiece holding part 230 is arranged in the transfer area 24 at least partially overlap.

As an example, when carrying the transfer holding part 510 to the transfer area 24 of any one of the work robot systems 5 and carrying the transfer holding part 510 to the transfer area 24 of another one of the work robot systems 5 are executed by the handling robot 500 in different time periods, the revolution control parts 411 of the multiple work robot systems 5 respectively arrange workpiece holding parts 230 for transfer of workpieces (W) in the transfer areas 24 in different time periods.

Figure 7:
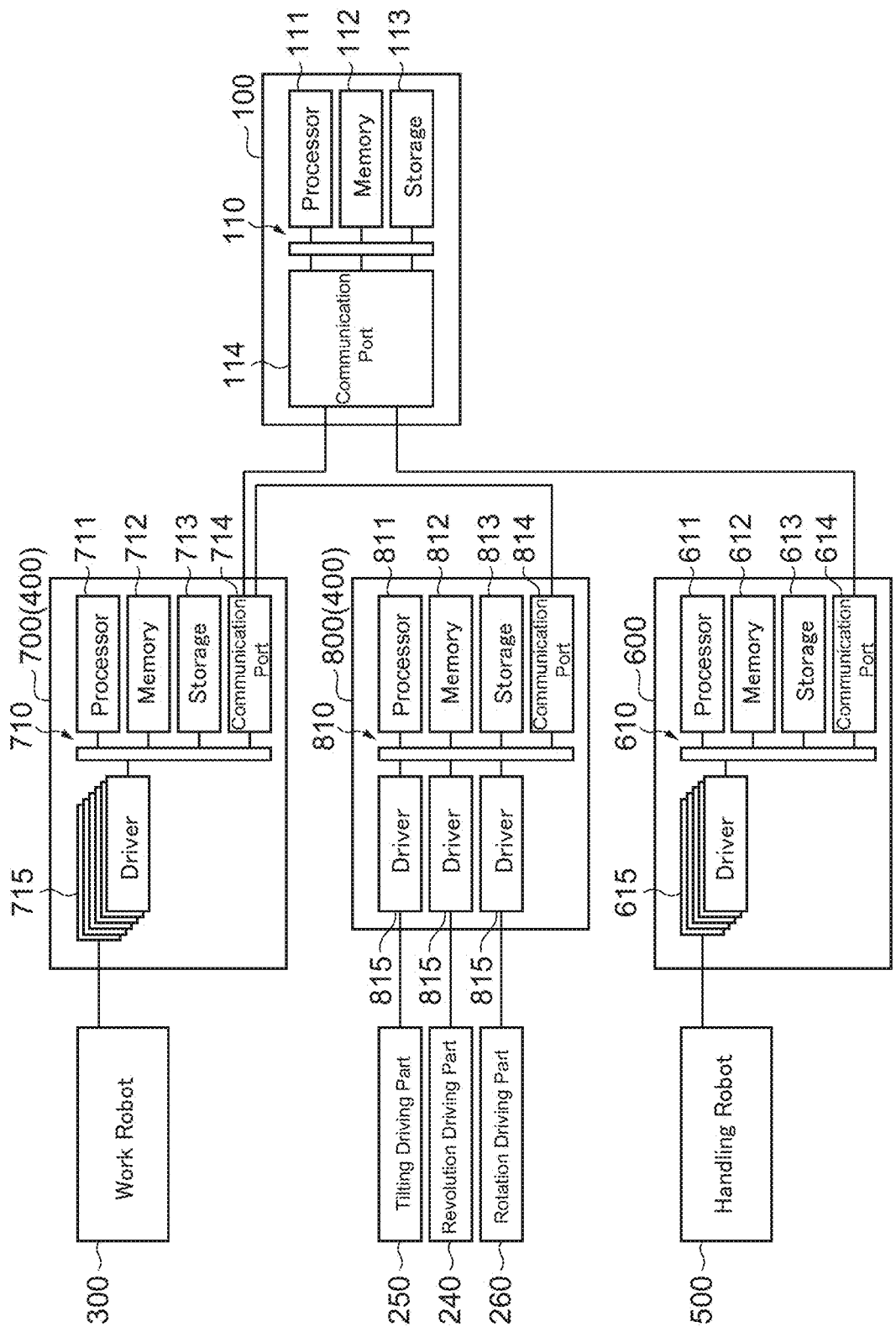
FIG. 7 is a block diagram illustrating hardware structures of a work controller, a handling controller and a sequence controller.

FIG. 7 is a block diagram illustrating hardware structures of the work controller, the handling controller and the sequence controller. As illustrated in FIG. 7, the work controller 400 includes a robot controller 700 that controls the work robot 300 and a multi-axis controller 800 that controls the in-cell carrying device 200.

The robot controller 700 has a circuit 710. The circuit 710 includes one or multiple processors 711, a memory 712, a storage 713, a communication port 714, and a driver 715. The storage 713 is at least a memory medium such as a hard disk or a non-volatile memory. The storage 713 stores a program for causing the robot controller 700 and the multi-axis controller 800 to execute the following: causing the revolution driving part 240 to swivel the swivel part 220 so as to move the workpiece holding parts 230 between the transfer area 24 and the work area 23; causing the work robot 300 to perform a preset work with respect to a workpiece (W) held by a workpiece holding part 230 arranged in the work area 23; and, during a time period when the work robot 300 performs a work with respect to a workpiece (W) held by a workpiece holding part 230, causing the tilting driving part 250 to tilt the workpiece holding part 230 with respect to the central axis line 204 of the revolution orbit 203.

The memory 712 temporarily stores, for example, a program loaded from the storage 713 and an arithmetic result of the processor 711. The processor 711 executes the above program in cooperation with the memory 712. The communication port 714 transmits or receives information to or from the multi-axis controller 800 and the sequence controller 100 according to a command from the processor 711. For example, the communication port 714 transmits to the multi-axis controller 800 an operation command directed to the revolution driving part 240, the tilting driving part 250 and the rotation driving part 260. Further, the communication port 714 transmits to the sequence controller 100 information indicating an operation status of the in-cell carrying device 200 and the work robot 300, and receives from the sequence controller 100 an operation command for the in-cell carrying device 200 and the work robot 300. The driver 715 drives the motors (361, 362, 363, 364, 365, 366) according to a command from the processor 711.

The multi-axis controller 800 has a circuit 810. The circuit 810 includes one or multiple processors 811, a memory 812, a storage 813, a communication port 814, and a driver 815. The storage 813 is at least a memory medium such as a hard disk or a non-volatile memory. The storage 813 stores a program for operating the revolution driving part 240, the tilting driving part 250 and the rotation driving part 260 according to a command from the robot controller 700.

The memory 812 temporarily stores, for example, a program loaded from the storage 813 and an arithmetic result of the processor 811. The processor 811 executes the above program in cooperation with the memory 812. The communication port 814 transmits or receives information to or from the robot controller 700 according to a command from the processor 811. For example, the communication port 814 transmits to the robot controller 700 information indicating an operation status of the in-cell carrying device 200, and receives from the robot controller 700 an operation command directed to the revolution driving part 240, the tilting driving part 250 and the rotation driving part 260. The driver 815 drives the revolution driving part 240, the tilting driving part 250 and the rotation driving part 260 according to a command from the processor 811.

The handling controller 600 has a circuit 610. The circuit 610 includes one or multiple processors 611, a memory 612, a storage 613, a communication port 614, and a driver 615. The storage 613 is at least a memory medium such as a hard disk or a non-volatile memory. The storage 613 stores a program for causing the handling robot 500 to carry a workpiece (W) and to perform transfer of a workpiece (W) to or from a workpiece holding part 230 in a transfer area 24.

The memory 612 temporarily stores, for example, a program loaded from the storage 613 and an arithmetic result of the processor 611. The processor 611 executes the above program in cooperation with the memory 612. The communication port 614 transmits or receives information to or from the sequence controller 100 according to a command from the processor 611. For example, the communication port 614 transmits to the sequence controller 100 information indicating an operation status of the handling robot 500, and receives from the sequence controller 100 an operation command for the handling robot 500.

The sequence controller 100 has a circuit 110. The circuit 110 includes one or multiple processors 111, a memory 112, a storage 113, a communication port 114, and a driver 115. The storage 113 is at least a memory medium such as a hard disk or a non-volatile memory. The storage 113 stores a program for causing the sequence controller 100 to output various operation commands to the work controller 400 and the handling controller 600 so that the work robot systems 5 and the handling robot system 6 are coordinated.

The memory 112 temporarily stores, for example, a program loaded from the storage 113 and an arithmetic result of the processor 111. The processor 111 executes the above program in cooperation with the memory 112. The communication port 114 transmits or receives information to or from the work controller 400 and the handling controller 600 according to a command from the processor 111. For example, the communication port 114 receives from the work controller 400 information indicating an operation status of the in-cell carrying device 200 and the work robot 300, receives from the handling controller 600 information indicating an operation status of the handling robot 500, transmits to the work controller 400 an operation command for the in-cell carrying device 200 and the work robot 300, and transmits to handling controller 600 an operation command for the handling robot 500.

The hardware structures illustrated above are merely examples, and can be modified as appropriate as long as the same functions are achieved. The work controller 400, the handling controller 600, and the sequence controller 100 may be combined in one casing.

Control Method

Next, as an example of a control method, a control procedure of the production system 1 is illustrated. The control procedure includes: causing the revolution driving part 240 to swivel the swivel part 220 so as to move the workpiece holding parts 230 between the transfer area 24 and the work area 23; causing the work robot 300 to perform a preset work with respect to a workpiece (W) held by a workpiece holding part 230 arranged in the work area 23; and, during a time period when the work robot 300 performs a work with respect to a workpiece (W) held by a workpiece holding part 230, causing the tilting driving part 250 to tilt the workpiece holding part 230 with respect to the central axis line 204 of the revolution orbit 203.

The control procedure may further include: during a time period when the work robot 300 performs a work with respect to a workpiece (W) held by a workpiece holding part 230, causing the workpiece holding part 230 to rotate around the rotation axis line 263.

The control procedure may also include: causing the work robot 300 to perform a work in which the work arm 320 moves the painting tool 310 without pointing the painting tool 310 toward the base part 321 of the work arm 320, and, during a time period when the work robot 300 moves the painting tool 310, causing a whole painting target surface of a workpiece (W) to face the painting tool 310 by tilting the workpiece holding part 230 by the tilting driving part 250 and rotating the workpiece holding part 230 by the rotation driving part 260.

The control procedure may further include: causing the revolution driving part 240 to swivel the swivel part 220 so that the workpiece holding parts 230 are moved between the transfer area 24 and the work area 23; and, during at least a portion of a time period when the revolution driving part 240 swivels the swivel part 220, causing at least one of the workpiece holding parts 230 to be tilted toward the central axis line 204 side of the revolution orbit 203 by tilting by the tilting driving part 250.

The control procedure may further include: during at least a portion of a time period when the revolution driving part 240 swivels the swivel part 220, changing a posture of a workpiece (W) so as to avoid an obstacle by rotating a workpiece holding part 230 by the rotation driving part 260.

In the following, a more detailed control procedure is illustrated by dividing the control procedure into a workpiece (W) carrying procedure performed by the in-cell carrying device 200 (hereinafter, referred to as an "in-cell carrying procedure"), a workpiece (W) posture change procedure performed by the in-cell carrying device 200 during a painting time period (hereinafter, referred to as a "painting posture change procedure"), a workpiece (W) painting procedure performed by the work robot 300 (hereinafter, referred to as a "painting procedure"), and a workpiece (W) carry-in and carry-out procedure performed by the handling controller 600 (hereinafter, referred to as a "carry-in and carry-out procedure").

In-Cell Carrying Procedure

Figure 8:
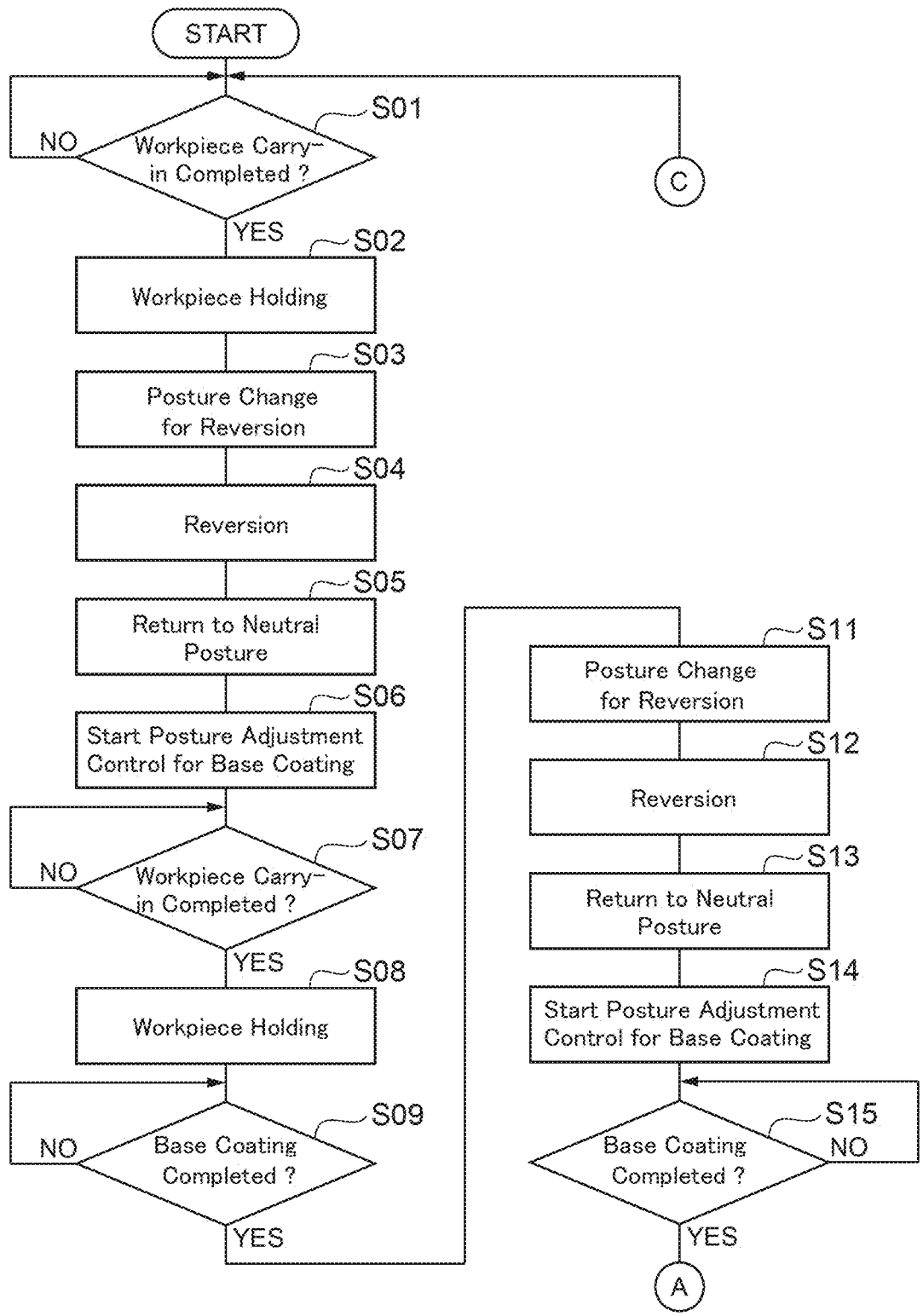
FIG. 8 is a flowchart illustrating a workpiece carrying procedure performed by an in-cell carrying device.

As illustrated in FIG. 8, the work controller 400 first executes steps (S01, S02, S03, S04, S05). In the step (S01), the revolution control part 411 waits for a workpiece (W) to be carried into the transfer area 24 by the handling robot 500 and the workpiece (W) to be arranged (for example, a support jig 270 to be arranged) in the workpiece holding part 230 in the transfer area 24. For example, the revolution control part 411 waits for reception of a holding command transmitted by the sequence controller 100 in response to completion of the arrangement of the workpiece (W) in the workpiece holding part 230.

In the step (S02), the revolution control part 411 causes the workpiece holding part 230 in the transfer area 24 to hold the workpiece (W). In the step (S03), the swivel posture adjustment part 412 causes the tilting driving part 250 to tilt all the workpiece holding parts 230 to the central axis line 204 side of the revolution orbit 203. In the step (S04), the revolution control part 411 causes the revolution driving part 240 to reverse the swivel part 220 by 180 degrees so that the workpiece holding parts 230 are interchanged with each other between the transfer area 24 and the work area 23.

In the step (S05), the swivel posture adjustment part 412 causes the tilting driving part 250 to cause all the workpiece holding parts 230 to each return to a posture before the step (S03) is executed (hereinafter this posture is referred to as a "neutral posture"). The neutral posture is, for example, a posture in which the protruding direction of a workpiece holding part 230 from a swivel arm 222 is vertically upward.

Next, the work controller 400 executes steps (S06, S07, S08, S09, S10, S11, S12, S13). In the step (S06), the workpiece posture adjustment part 413 starts control to adjust the posture of the workpiece holding part 230 positioned in the work area 23 to a posture for performing base coating with respect to the workpiece (W) held by the workpiece holding part 230. A specific content of the control started in the step (S06) will be described later as the painting posture change procedure.

In the step (S07), the revolution control part 411 waits for a workpiece (W) to be carried into the transfer area 24 by the handling robot 500 and the workpiece (W) to be arranged (for example, a support jig 270 to be arranged) in the workpiece holding part 230 in the transfer area 24. For example, the revolution control part 411 waits for reception of a holding command transmitted by the sequence controller 100 in response to completion of the arrangement of the workpiece (W) in the workpiece holding part 230.

In the step (S08), the revolution control part 411 causes the workpiece holding part 230 in the transfer area 24 to hold the workpiece (W). In the step (S09), the revolution control part 411 waits for completion of the base coating with respect to the workpiece (W) in the work area 23. In the step (S11), the swivel posture adjustment part 412 causes the tilting driving part 250 to tilt all the workpiece holding parts 230 to the central axis line 204 side of the revolution orbit 203. In the step (S12), the revolution control part 411 causes the revolution driving part 240 to reverse the swivel part 220 by 180 degrees so that the workpiece holding parts 230 are interchanged with each other between the transfer area 24 and the work area 23. In the step (S13), the swivel posture adjustment part 412 causes all the workpiece holding parts 230 to return to the neutral posture.

Next, the work controller 400 executes steps (S14, S15). In the step (S14), the workpiece posture adjustment part 413 starts control to adjust the posture of the workpiece holding part 230 positioned in the work area 23 to a posture for performing base coating with respect to the workpiece (W) held by the workpiece holding part 230. A specific content of the control started in the step (S14) will be described later as the painting posture change procedure. In the step (S15), the revolution control part 411 waits for completion of the base coating with respect to the workpiece (W) in the work area 23.

Figure 9:
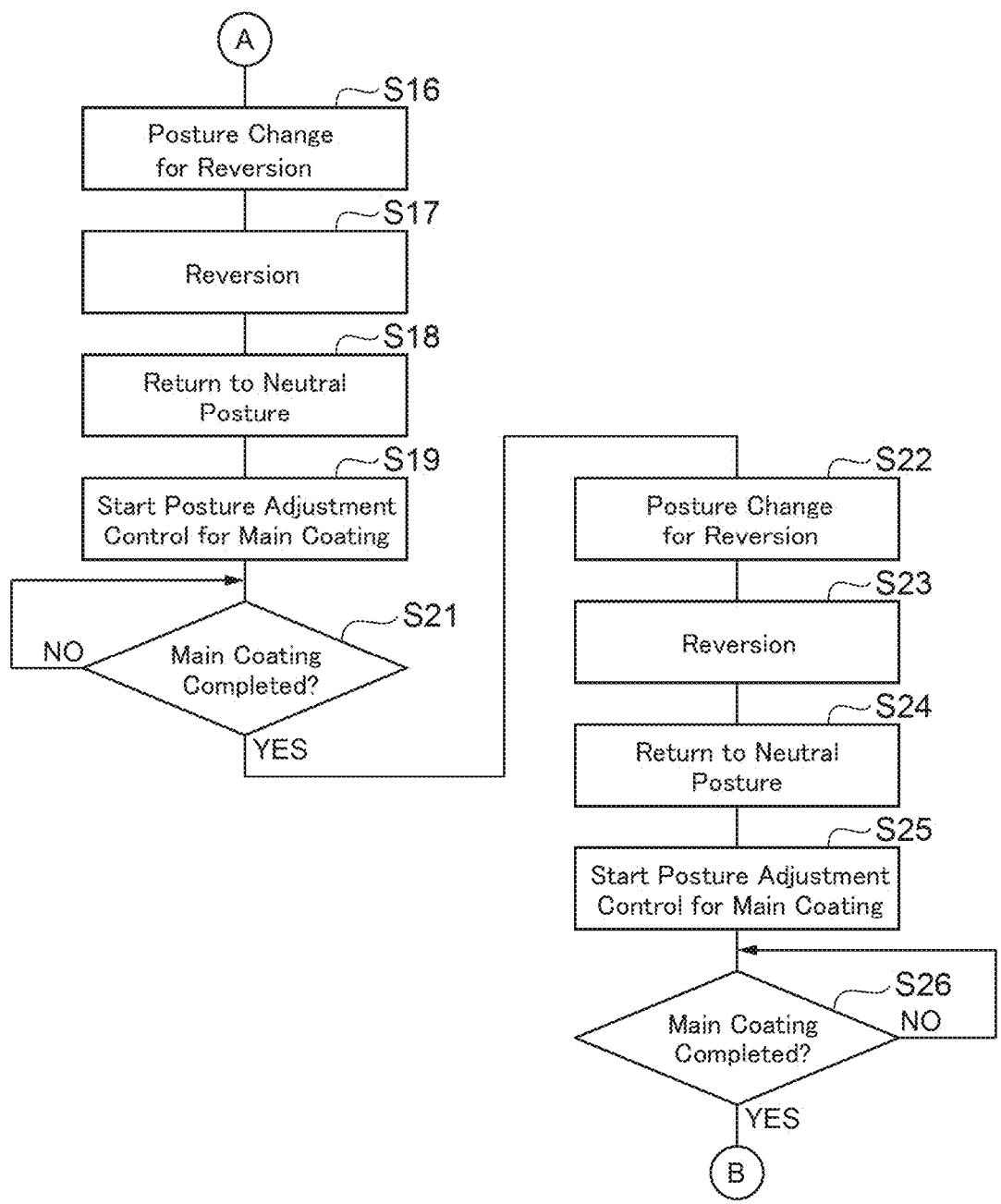
FIG. 9 is a flowchart illustrating the workpiece carrying procedure performed by the in-cell carrying device.

As illustrated in FIG. 9, the work controller 400 next executes steps (S16, S17, S18, S19, S21). In the step (S16), the swivel posture adjustment part 412 causes the tilting driving part 250 to tilt all the workpiece holding parts 230 to the central axis line 204 side of the revolution orbit 203. In the step (S17), the revolution control part 411 causes the revolution driving part 240 to reverse the swivel part 220 by 180 degrees so that the workpiece holding parts 230 are interchanged with each other between the transfer area 24 and the work area 23. In the step (S18), the swivel posture adjustment part 412 causes all the workpiece holding parts 230 to return to the neutral posture.

In the step (S19), the workpiece posture adjustment part 413 starts control to adjust the posture of the workpiece holding part 230 positioned in the work area 23 to a posture for performing main coating with respect to the workpiece (W) held by the workpiece holding part 230. A specific content of the control started in the step (S19) will be described later as the painting posture change procedure. In the step (S21), the revolution control part 411 waits for completion of the main coating with respect to the workpiece (W) in the work area 23.

Next, the work controller 400 executes steps (S22, S23, S24, S25, S26). In the step (S22), the swivel posture adjustment part 412 causes the tilting driving part 250 to tilt all the workpiece holding parts 230 to the central axis line 204 side of the revolution orbit 203. In the step (S23), the revolution control part 411 causes the revolution driving part 240 to reverse the swivel part 220 by 180 degrees so that the workpiece holding parts 230 are interchanged with each other between the transfer area 24 and the work area 23. In the step (S24), the swivel posture adjustment part 412 causes all the workpiece holding parts 230 to return to the neutral posture.

In the step (S25), the workpiece posture adjustment part 413 starts control to adjust the posture of the workpiece holding part 230 positioned in the work area 23 to a posture for performing main coating with respect to the workpiece (W) held by the workpiece holding part 230. A specific content of the control started in the step (S25) will be described later as the painting posture change procedure. In the step (S26), the revolution control part 411 waits for completion of the main coating with respect to the workpiece (W) in the work area 23.

Figure 10:
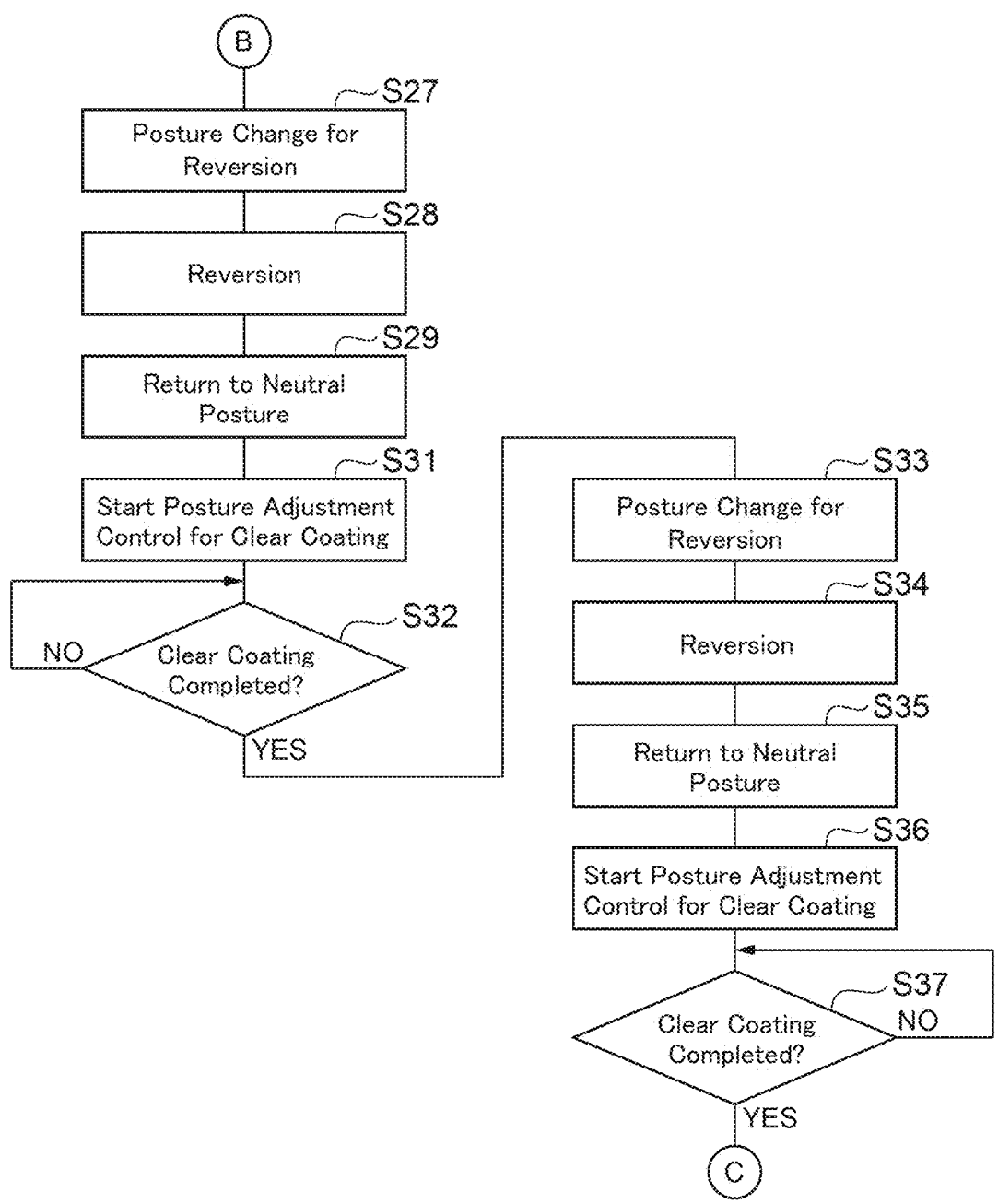
FIG. 10 is a flowchart illustrating the workpiece carrying procedure performed by the in-cell carrying device.

As illustrated in FIG. 10, the work controller 400 next executes steps (S27, S28, S29, S31, S32). In the step (S27), the swivel posture adjustment part 412 causes the tilting driving part 250 to tilt all the workpiece holding parts 230 to the central axis line 204 side of the revolution orbit 203. In the step (S28), the revolution control part 411 causes the revolution driving part 240 to reverse the swivel part 220 by 180 degrees so that the workpiece holding parts 230 are interchanged with each other between the transfer area 24 and the work area 23. In the step (S29), the swivel posture adjustment part 412 causes all the workpiece holding parts 230 to return to the neutral posture.

In the step (S31), the workpiece posture adjustment part 413 starts control to adjust the posture of the workpiece holding part 230 positioned in the work area 23 to a posture for performing clear coating with respect to the workpiece (W) held by the workpiece holding part 230. A specific content of the control started in the step (S31) will be described later as the painting posture change procedure. In the step (S32), the revolution control part 411 waits for completion of the clear coating with respect to the workpiece (W) in the work area 23.

Next, the work controller 400 executes steps (S33, S34, S35, S36, S37). In the step (S33), the swivel posture adjustment part 412 causes the tilting driving part 250 to tilt all the workpiece holding parts 230 to the central axis line 204 side of the revolution orbit 203. In the step (S34), the revolution control part 411 causes the revolution driving part 240 to reverse the swivel part 220 by 180 degrees so that the workpiece holding parts 230 are interchanged with each other between the transfer area 24 and the work area 23. In the step (S35), the swivel posture adjustment part 412 causes all the workpiece holding parts 230 to return to the neutral posture.

In the step (S36), the workpiece posture adjustment part 413 starts control to adjust the posture of the workpiece holding part 230 positioned in the work area 23 to a posture for performing clear coating with respect to the workpiece (W) held by the workpiece holding part 230. A specific content of the control started in the step (S36) will be described later as the painting posture change procedure. In the step (S37), the revolution control part 411 waits for completion of the clear coating with respect to the workpiece (W) in the work area 23. As a result, one cycle of the in-cell carrying procedure is completed. After that, the work controller 400 returns the process to the step (S01) and repeats the above in-cell carrying procedure.

In a second and subsequent cycles, the handling robot 500, which arranges a workpiece (W) in a transfer area 24, carries a painted workpiece (W) from a transfer area 24 to the conveyor 4, and then carries an unpainted workpiece (W) from the conveyor 4 to the transfer area 24.

As described above, during at least a portion of a time period when the revolution driving part 240 swivels the swivel part 220, the swivel posture adjustment part 412 may change a posture of a workpiece (W) so as to avoid an obstacle by rotating a workpiece holding part 230 by the rotation driving part 260. For example, during the execution of the steps (S04, S12, S17, S23, S28, S34), the swivel posture adjustment part 412 changes the posture of the workpiece (W) so as to avoid an obstacle by rotating the workpiece holding part 230 by the rotation driving part 260.

Figure 11:
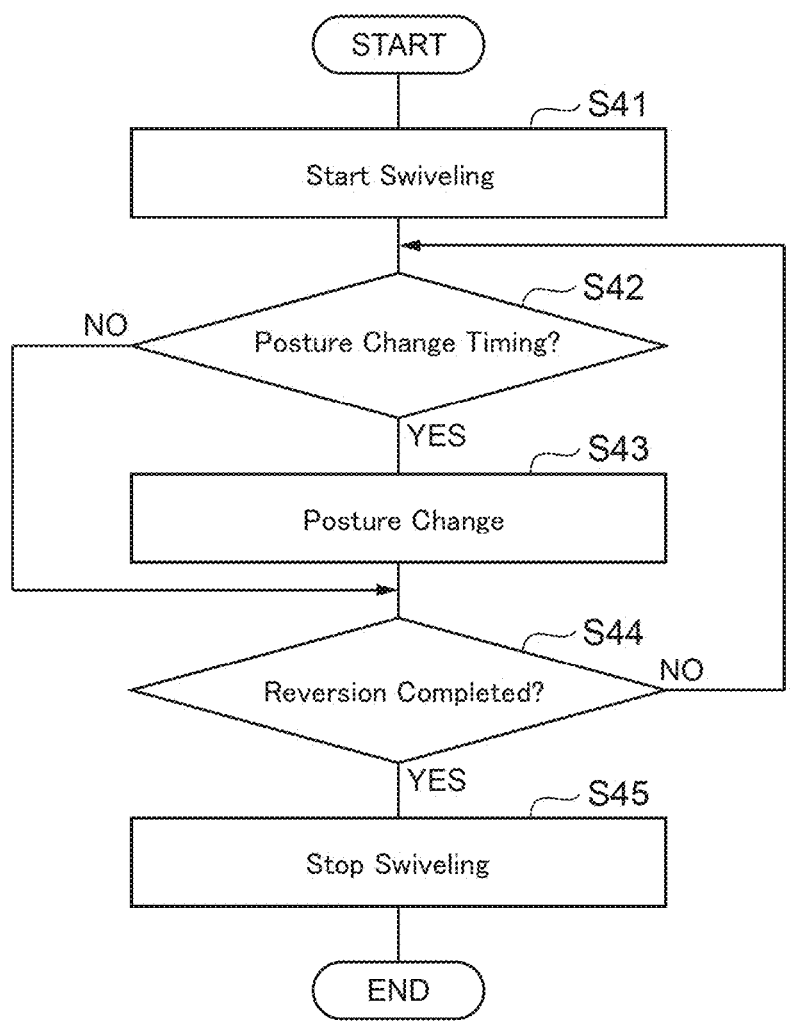
FIG. 11 is a flowchart illustrating a posture change procedure during reversion.

FIG. 11 is a flowchart illustrating a reversion procedure of the swivel part 220 in the steps (S04, S12, S17, S23, S28, S34). As illustrated in FIG. 11, the work controller 400 first executes steps (S41 S42). In the step (S41), the revolution control part 411 causes swiveling of the swivel part 220 by the revolution driving part 240 to start. In the step (S42), the swivel posture adjustment part 412 confirms whether or not a preset posture change timing for avoiding an obstacle has been reached.

When it is determined in the step (S42) that the preset posture change timing for avoiding an obstacle has been reached, the work controller 400 executes a step (S43). In the step (S43), the swivel posture adjustment part 412 causes the rotation driving part 260 to rotate the workpiece holding part 230 at preset rotation direction and rotation angle for avoiding an obstacle.

Next, the work controller 400 executes a step (S44). When it is determined in the step (S42) that the preset posture change tuning for avoiding an obstacle has not been reached, the work controller 400 executes a step (S44) without executing the step (S43). In the step (S44), the revolution control part 411 confirms whether or not the reversion of the swivel part 220 has been completed.

When it is determined in the step (S44) that the reversion of the swivel part 220 has not been completed, the work controller 400 causes the process to return to the step (S42). After that, until the reversion is completed, the swiveling of the swivel part 220 is continued while rotation for obstacle avoidance is performed when necessary. When it is determined in the step (S44) that the reversion of the swivel part 220 has been completed, the work controller 400 executes a step (S45). In the step (S45), the revolution control part 411 causes the swiveling of the swivel part 220 by the revolution driving part 240 to stop. As a result, the reversion procedure is completed.

Painting Posture Change Procedure

Figure 12:
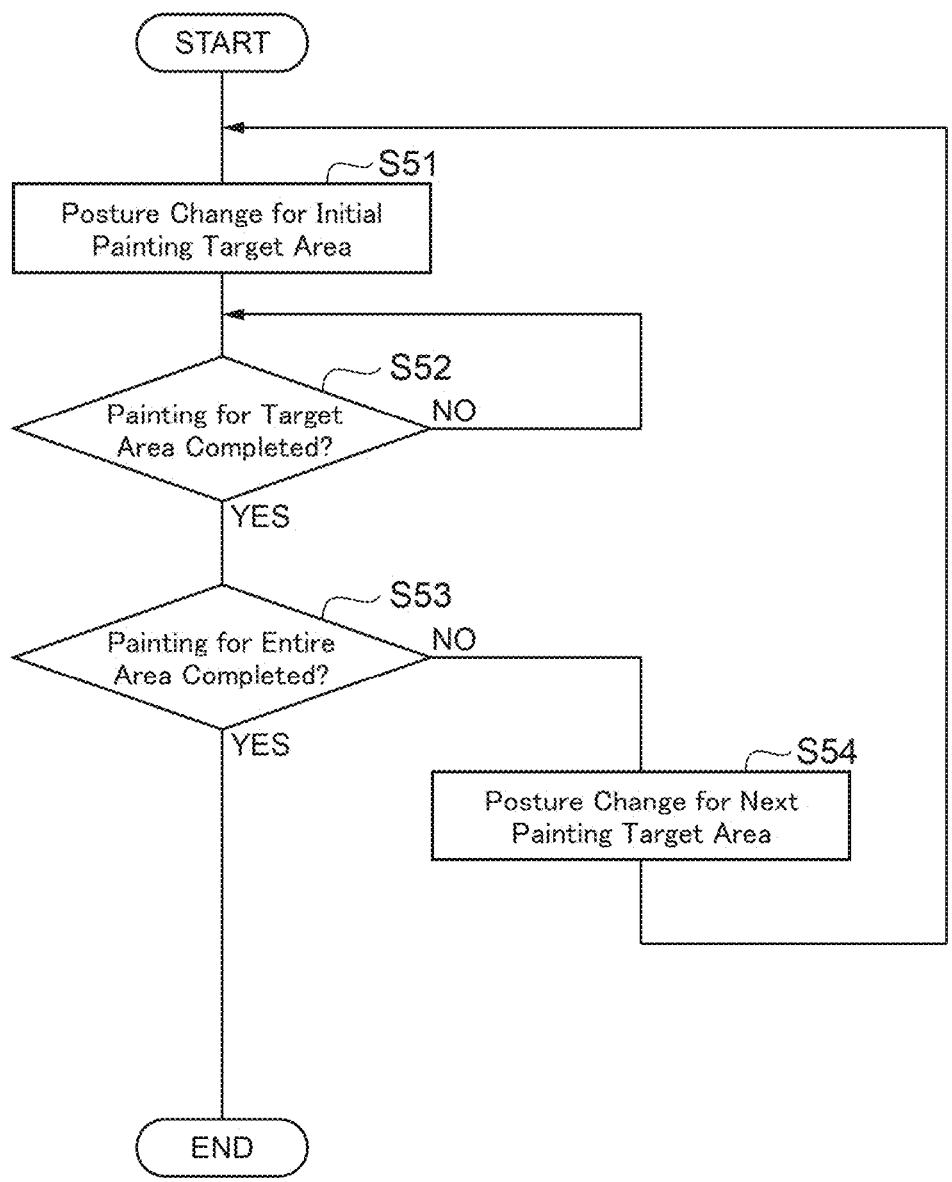
FIG. 12 is a flowchart illustrating a workpiece carry-in and carry-out procedure.

FIG. 12 is a flowchart illustrating the painting posture change procedure which is started in each of the steps (S06, S14, S19, S25, S31, S36). As illustrated in FIG. 12, the work controller 400 first executes steps (S51 S52, S53). In the step (S51), in order to change the posture of the workpiece (W) in the work area 23 to a posture preset for an initial painting target area by the work robot 300, the workpiece posture adjustment part 413 performs at least one of tilting of the workpiece holding part 230 by the tilting driving part 250 and rotation of the workpiece holding part 230 by the rotation driving part 260. In the step (S52), the workpiece posture adjustment part 413 waits for completion of painting by the work robot 300 with respect to a current painting target area. In the step (S53), the workpiece posture adjustment part 413 confirms whether or not painting for an entire painting target surface of the workpiece (W) has been completed.

When it is determined in the step (S53) that an unpainted area remains, the work controller 400 executes a step (S54). In the step (S54), in order to change the posture of the workpiece (W) in the work area 23 to a posture preset for a next painting target area by the work robot 300, the workpiece posture adjustment part 413 performs at least one of tilting of the workpiece holding part 230 by the tilting driving part 250 and rotation of the workpiece holding part 230 by the rotation driving part 260. After that, the work controller 400 causes the process to return to the step (S51). After that, a posture change of the workpiece (W) according to a painting target area is repeated until painting for the entire painting target surface of the workpiece (W) is completed. When it is determined in the step (S53) that painting for the entire painting target surface of the workpiece (W) has been completed, the painting posture change procedure is completed.

Painting Procedure

Figure 13:
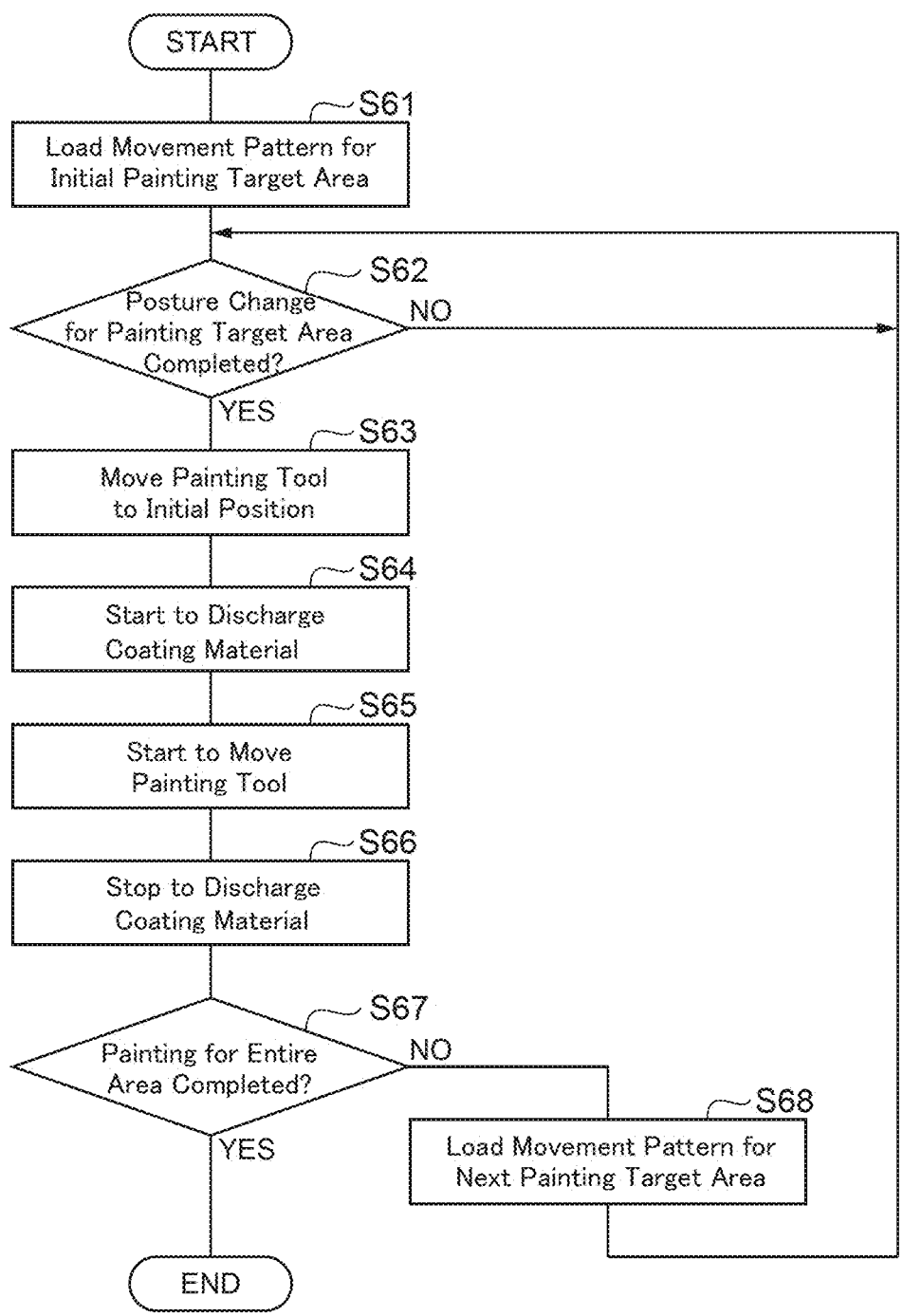
FIG. 13 is a flowchart illustrating a posture change procedure during painting.

As illustrated in FIG. 13, the work controller 400 first executes steps (S61, S62, S63, S64, S65, S66, S67). In the step (S61), the robot control part 414 loads a movement pattern of the painting tool 310 corresponding to an initial painting target area of the workpiece (W) in the work area 23. In the step (S62), the robot control part 414 waits for completion of a posture change of the workpiece (W) for a painting target area corresponding to the loaded movement pattern. In the step (S63), the robot control part 414 causes the work arm 320 to move the painting tool 310 such that the painting tool 310 is arranged at an initial position and in an initial posture of the movement pattern.

Next, the work controller 400 executes steps (S64, S65, S66, S67). In the step (S64), the robot control part 414 causes discharging of a coating material from the painting tool 310 to start. For example, the robot control part 414 causes discharging of a coating material from the discharge nozzle 311 to start in the case of base coating, causes discharging of a coating material from the discharge nozzle 312 to start in the case of main coating, and causes discharging of a coating material from the nozzle 313 to start in the case of clear coating. In the step (S65), the robot control part 414 causes the work arm 320 to move the painting tool 310 according to the movement pattern. As a result, a coating material is sprayed on a current painting target area. In the step (S66), the robot control part 414 causes discharging of a coating material from the painting tool 310 to stop. In the step (S67), the robot control part 414 confirms whether or not painting for the entire painting target surface of the workpiece (W) has been completed.

When it is determined in the step (S67) that an unpainted area remains, the work controller 400 executes a step (S68). In the step (S68), the robot control part 414 loads a movement pattern of the painting tool 310 corresponding to a next painting target area of the workpiece (W) in the work area 23. After that, the work controller 400 causes the process to return to the step (S61). After that, painting for each painting target area is repeated until painting for the entire painting target surface is completed. When it is determined in the step (S67) that the painting for the entire painting target surface of the workpiece (W) has been completed, the painting procedure is completed.

Carry-In and Carry-Out Procedure

Figure 14:
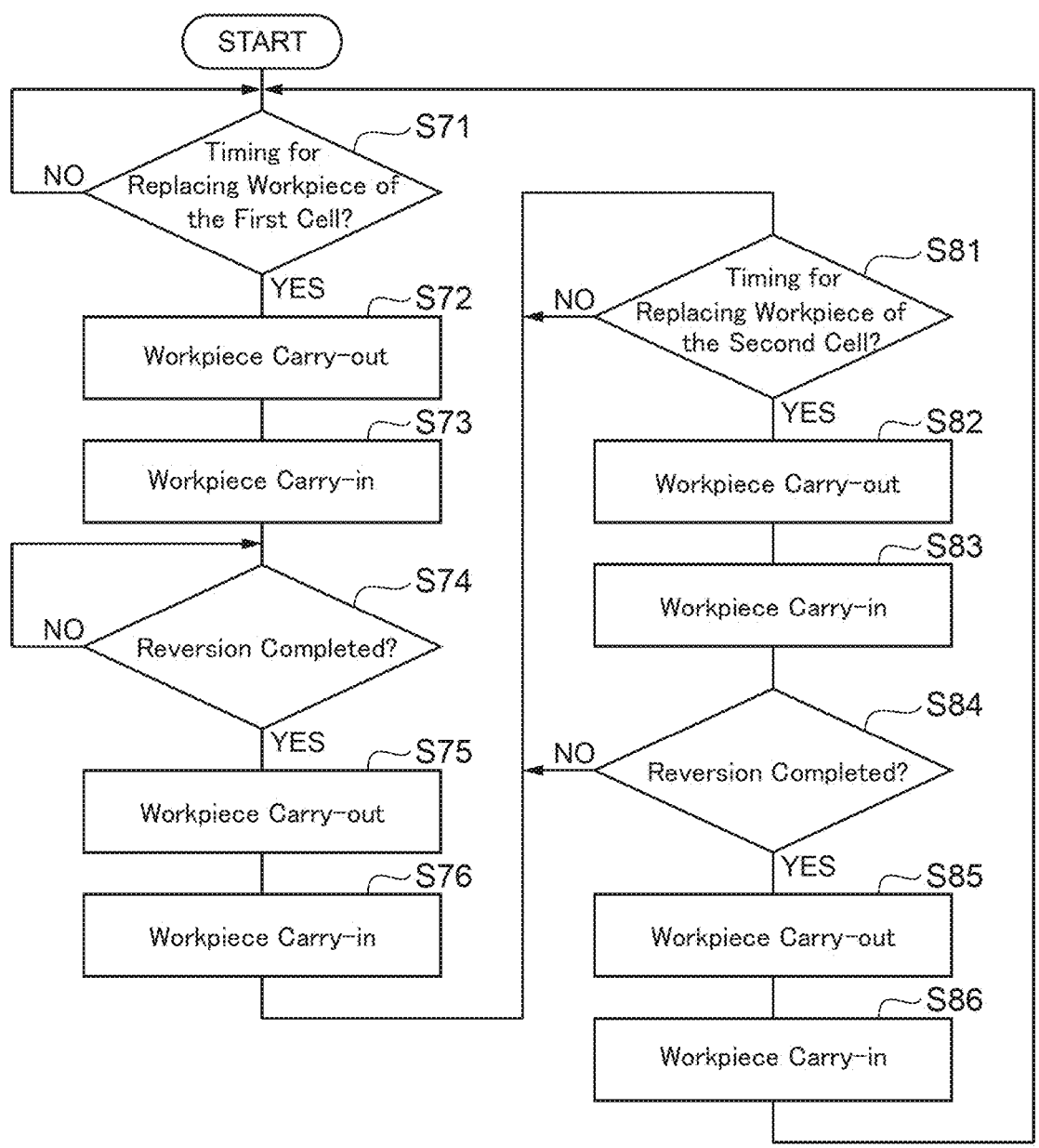
FIG. 14 is a flowchart illustrating a workpiece painting procedure performed by a work robot.

FIG. 14 is a flowchart illustrating a carry-in and carry-out procedure of a case where the handling robot 500 arranges the transfer holding part 510 in the transfer areas 24 of two work cells 2. In the following, for convenience of description, one of the two work cells 2 is referred to as a "first cell" and the other one is referred to as a "second cell."

First, in a step (S71), the handling controller 600 waits for a timing for replacing a workpiece (W) in the transfer area 24 of the first cell. For example, based on a timing at which the above-described one cycle of the in-cell carrying procedure is completed in the first cell, the handling controller 600 waits for reception of a workpiece (W) replacement command transmitted by the sequence controller 100. The workpiece (W) replacement command may be transmitted prior to the completion of the one cycle of the in-cell carrying procedure. The same applies to the following.

Next, in a step (S72), the handling controller 600 causes the handling robot 500 to carry out a painted workpiece (W) from the transfer area 24 of the first cell. For example, the handling controller 600 causes the handling robot 500 to execute the following: causing the handling arm 520 to move the transfer holding part 510 to the transfer area 24 of the first cell and causing the transfer holding part 510 to hold a support jig 270 held by a workpiece holding part 230; causing the handling arm 520 to move the transfer holding part 510 holding the support jig 270 to the conveyor 4; and releasing the support jig 270 from the transfer holding part 510.

Next, in a step (S73), the handling controller 600 causes the handling robot 500 to carry an unpainted workpiece (W) into the transfer area 24 of the first cell. For example, the handling controller 600 causes the handling robot 500 to execute the following: moving the transfer holding part 510 to a position of an unpainted workpiece (W) and causing the transfer holding part 510 to hold a support jig 270; causing the handling arm 520 to move the transfer holding part 510 holding the support jig 270 to the transfer area 24 of the first cell and arrange the base part 272 of the support jig 270 in a workpiece holding part 230; and releasing the support jig 270 from the transfer holding part 510.

Next, in a step (S74), the handling controller 600 waits for completion of reversion of the swivel part 220 of the first cell. For example, based on a timing at which the reversion of the swivel part 220 is completed in the first cell, the handling controller 600 waits for reception of a workpiece (W) replacement command transmitted by the sequence controller 100. Next, in a step (S75), similar to the step (S72), the handling controller 600 causes the handling robot 500 to carry out a painted workpiece (W) from the transfer area 24 of the first cell. Next, in a step (S76), similar to the step (S73), the handling controller 600 causes the handling robot 500 to carry an unpainted workpiece (W) into the transfer area 24 of the first cell.

Next, in a step (S81), the handling controller 600 waits for a timing for replacing a workpiece (W) in the transfer area 24 of the second cell. For example, based on a timing at which the above-described one cycle of the in-cell carrying procedure is completed in the second cell, the handling controller 600 waits for reception of a workpiece (W) replacement command transmitted by the sequence controller 100.

Next, in a step (S82), the handling controller 600 causes the handling robot 500 to carry out a painted workpiece (W) from the transfer area 24 of the second cell. For example, the handling controller 600 causes the handling robot 500 to execute the following: causing the handling arm 520 to move the transfer holding part 510 to the transfer area 24 of the second cell and causing the transfer holding part 510 to hold a support jig 270 held by a workpiece holding part 230; causing the handling arm 520 to move the transfer holding part 510 holding the support jig 270 to the conveyor 4; and releasing the support jig 270 from the transfer holding part 510.

Next, in a step (S83), the handling controller 600 causes the handling robot 500 to carry an unpainted workpiece (W) into the transfer area 24 of the second cell. For example, the handling controller 600 causes the handling robot 500 to execute the following: moving the transfer holding part 510 to a position of an unpainted workpiece (W) and causing the transfer holding part 510 to hold a support jig 270; causing the handling arm 520 to move the transfer holding part 510 holding the support jig 270 to the transfer area 24 of the second cell and arrange the base part 272 of the support jig 270 in a workpiece holding part 230; and releasing the support jig 270 from the transfer holding part 510.

Next, in a step (S84), the handling controller 600 waits for completion of reversion of the swivel part 220 of the second cell. For example, based on a timing at which the reversion of the swivel part 220 is completed in the second cell, the handling controller 600 waits for reception of a workpiece (W) replacement command transmitted by the sequence controller 100. Next, in a step (S85), similar to the step (S82), the handling controller 600 causes the handling robot 500 to carry out a painted workpiece (W) from the transfer area 24 of the second cell. Next, in a step (S86), similar to the step (S83), the handling controller 600 causes the handling robot 500 to carry an unpainted workpiece (W) into the transfer area 24 of the second cell. As a result, one cycle of the carry-in and carry-out procedure is completed. After that, the handling controller 600 causes the process to return to the step (S71), and the above carry-in and carry-out procedure is repeated.

As described above, the in-cell carrying device 200 includes: the swivel part 220 capable of swiveling around the central axis line 204 of the revolution orbit 203 that passes through the transfer area 24 of a workpiece (W) and the work area 23 of a workpiece (W) to be worked by the work robot 300; multiple workpiece holding parts 230 that are provided on the swivel part 220 such that when one of the workpiece holding parts 230 is positioned in the transfer area 24, another one of the workpiece holding parts 230 is positioned in the work area 23; a revolution driving part 240 that causes the swivel part 220 to swivel around the central axis line 204 of the revolution orbit 203; and a tilting driving part 250 that causes each of the multiple workpiece holding parts 230 to tilt with respect to the central axis line 204 of the revolution orbit 203. It is also possible that the tilting driving part 250 causes each of the multiple workpiece holding parts 230 to be tilted around the tilting axis line 253 perpendicular to the central axis line 204 of the revolution orbit 203.

According to the in-cell carrying device 200, the workpiece holding part 230 in the work area 23 can be tilted by the tilting driving part 250, and the posture of the workpiece (W) can be adjusted according to the work performed by the work robot 300. For example, a part of a workpiece (W) to be worked by the work robot 300 can be caused to face the work robot 300 side. Further, the work of the work robot 300 in the work area 23 and the transfer of a workpiece (W) in the transfer area 24 can be performed in parallel, and, as soon as the work of the work robot 300 is completed, by swiveling the swivel part 220, the workpiece holding parts 230 can be quickly moved. Therefore, both a work time and a work waiting time of the work robot 300 can be reduced. Therefore, it is effective in improving work efficiency of the work robot 300.

The in-cell carrying device 200 may further include the rotation driving part 260 that rotates each of the multiple workpiece holding parts 230 around a rotation axis line 254 perpendicular to the tilting axis line 253 for tilting the each of the workpiece holding parts 230. In this case, the posture of the workpiece (W) can be more flexibly adjusted according to the work performed by the work robot 300 by combining tilting and rotation. Therefore, it is more effective in improving the work efficiency of the work robot 300.

The work robot system 5 includes: the in-cell carrying device 200; the work robot 300; the robot control part 414 that causes the work robot 300 to perform a preset work with respect to a workpiece (W) held by the workpiece holding part 230 positioned in the work area 23; and a workpiece posture adjustment part 413 that, during a time period when the work robot 300 performs a work with respect to a workpiece (W) held by the workpiece holding part 230, changes a posture of the workpiece (W) by tilting the workpiece holding part 230 by the tilting driving part 250. According to the work robot system 5, by causing the workpiece holding part 230 to tilt during the time period when the work robot 300 performs the work, the tilting of the workpiece holding part 230 can be more reliably utilized in improving the work efficiency.

It is also possible that, during a time period when the work robot 300 performs a work with respect to a workpiece (W) held by a work holding part 230, the workpiece posture adjustment part 413 changes the posture of the workpiece (W) by tilting the workpiece holding part 230 by the tilting driving part 250 and rotating the workpiece holding part 230 by the rotation driving part 260. In this case, by causing the workpiece holding part 230 to tilt and rotate during the time period when the work robot 300 performs the work, the tilting and rotation of the workpiece holding part 230 can be more reliably utilized in improving the work efficiency.

The work robot 300 includes the painting tool 310 that discharges a coating material, and the multi-joint work arm 320 that changes the position and the posture of the painting tool 310. The robot control part 414 may cause the work arm 320 to move the painting tool 310 without pointing the painting tool 310 toward the base part 321 of the work arm 320, and, during a time period when the work robot 300 moves the painting tool 310, the workpiece posture adjustment part 413 may cause a whole painting target surface of a workpiece (W) to face the painting tool 310 by tilting the workpiece holding part 230 by the tilting driving part 250 and rotating the workpiece holding part 230 by the rotation driving part 260. In this case, by adjusting the posture of the workpiece (W) by tilting the workpiece holding part 230 by the tilting driving part 250 and by rotating the workpiece holding part 230 by the rotation driving part 260, the painting work can be completed without pointing the painting tool 310 toward the base part 321 of the work arm 320. As a result, adhesion of a coating material to the work arm 320 itself can be suppressed, and maintenance frequency of the work robot 300 can be reduced. Therefore, it is more effective in improving the work efficiency of the work robot 300.

The work robot system 5 may further include the revolution control part 411 that causes the revolution driving part 240 to swivel the swivel part 220 so that the workpiece holding parts 230 are moved between the transfer area 202 and the work area 201; and the swivel posture adjustment part 412 that, during at least a portion of a time period when the revolution driving part 240 swivels the swivel part 220, causes all the workpiece holding parts 230 to be tilted toward the central axis line 204 side of the revolution orbit 203 by tilting by the tilting driving part 250. In this case, during at least a portion of a time period when the revolution control part 411 causes the swivel part 220 to swivel, all the workpiece holding parts 230 are tilted toward the central axis line 204 side of the revolution orbit 203. As a result, the workpiece (W) is closer to the central axis line 204 side of the revolution orbit 203, and thus, a revolution radius of the workpiece (W) accompanying the swiveling of the swivel part 220 is reduced. Therefore, a space for carrying the workpiece (W) can be reduced. Further, a centrifugal force acting on the workpiece (W) decreases as the revolution radius of the workpiece (W) decreases. Further, since the workpiece holding parts 230 are inclined toward the central axis line 204 side of the revolution orbit 203, a resistive force against the centrifugal force can be easily generated. Therefore, a swiveling speed of the swivel part 220 can be increased. Therefore, it is more effective in improving the work efficiency of the work robot 300.

During at least a portion of a time period when the revolution driving part 240 swivels the swivel part 220, the swivel posture adjustment part 412 may change a posture of a workpiece (W) so as to avoid an obstacle (OB) by rotating a workpiece holding part 230 by the rotation driving part 260. In this case, the space for carrying the workpiece (W) can be further reduced.

The production system 1 includes: the robot system 5; and the handling robot 500 that carries a workpiece (W) and performs transfer of a workpiece (W) to or from the workpiece holding part 230 in the transfer area 24. The handling robot 500 has the transfer holding part 510 that performs transfer of a workpiece (W) to or from the workpiece holding part 230, and the multi-joint handling arm 520 that moves the transfer holding part 510, and the base part of the handling arm 520 is installed above the in-cell carrying device 200. According to the production system 1, the handling arm 520 is installed above the in-cell carrying device 200, and thus, interference between the handling arm 520 and the in-cell carrying device 200 is less likely to occur. Further, a work space for a worker can be easily provided below the handling arm 520. Therefore, it is effective for space reduction of the production system 1.

The handling arm 520 may have the multi-joint first scalar arm 530 that moves the front end part thereof in a horizontal plane, and the multi-joint second scalar arm 540 that is connected to the front end part of the first scalar arm 530 and moves the transfer holding part 510 in a vertical plane. In this case, interference between the handling arm 520 and the in-cell carrying device 200 is more less likely to occur. Further, a work space for a worker can be more easily provided below the handling arm 520. Therefore, it is more effective for space reduction of the production system 1.

The production system 1 may include the multiple work robot systems 5, and the handling robot 500 may be installed such that the transfer holding part 510 can be arranged in the transfer areas 24 of the multiple work robot systems 5. In this case, the handling arm 520 can be shared by the multiple work robot systems 5. Therefore, it is more effective for space reduction of the production system 1.

The production system 1 may further include the handling controller 600 that causes the handling robot 500 to perform, in different time periods, carrying the transfer holding part 510 to the transfer area 24 of one of the work robot systems 5 and carrying the transfer holding part 510 to the transfer area 24 of another one of the work robot systems 5. In this case, the handling arm 520 can be shared by the multiple work robot systems 5. Therefore, it is more effective for space reduction of the production system 1. Further, when the handling arm 520 is shared, the operations of the work robot systems 5 are finely adjusted in accordance with the operation of the handling arm 520. Therefore, the above-described effect of reducing both the work time and the work waiting time of the work robot 300 becomes more beneficial.

The revolution control part 411 of each of the work robot systems 5 may cause the swivel part 220 to swivel so as to arrange a workpiece holding part 230 for transfer of a workpiece (W) in a transfer area 24 in accordance with the timing at which the handling robot 500 arranges the transfer holding part 510 in the transfer area 24. In this case, a time loss associated with the sharing of the handling arm 520 can be reduced.

In the above, the embodiment is described. However, the present disclosure is not necessarily limited to the above-described embodiment, and various modifications can be made within a scope without departing from the spirit of the present disclosure. For example, in the above-described embodiment, the structure is described in which all of the base coating, the main coating, and the clear coating are performed in one work cell 2. However, the present disclosure is not limited to this. The work cells 2 may each specialize in any one of the base coating, the main coating and the clear coating.

Further, the work performed by the work robot systems 5 is not necessarily limited to a painting work. The present invention can be applied to any work that requires a workpiece (W) to be arranged around the work robot 300.

A device and systems according to embodiments of the present invention are effective in improving work efficiency of a robot.

A carrying device according to one aspect of the present disclosure includes: a swivel part capable of swiveling around a central axis line of a revolution orbit that passes through a transfer area of a workpiece and a work area of a workpiece to be worked by a robot; multiple workpiece holding parts that are provided on the swivel part such that when one of the workpiece holding parts is positioned in the transfer area, another one of the workpiece holding parts is positioned in the work area; a revolution driving part that causes the swivel part to swivel around the central axis line of the revolution orbit; and a tilting driving part that causes each of the multiple workpiece holding parts to tilt with respect to the central axis line of the revolution orbit.

A robot system according to another aspect of the present disclosure includes: the above carrying device; a robot; a robot control part that causes the robot to perform a preset work with respect to a workpiece held by the workpiece holding part positioned in the work area; and a workpiece posture adjustment part that, during a time period when the robot performs a work with respect to a workpiece held by a workpiece holding part, changes a posture of the workpiece by tilting the workpiece holding part by the tilting driving part.

A production system according to yet another aspect of the present disclosure includes: the above robot system; and a handling robot that carries a workpiece and performs transfer of a workpiece to or from the workpiece holding part in the transfer area. The handling robot has a transfer holding part that performs transfer of a workpiece to or from a workpiece holding part, and a multi-joint handling arm that moves the transfer holding part, and a base part of the handling arm is installed above the carrying device.

A control method according to still another aspect of the present disclosure includes: in a carrying device that includes: a swivel part capable of swiveling around a central axis line of a revolution orbit that passes through a transfer area of a workpiece and a work area of a workpiece to be worked by a robot; and multiple workpiece holding parts that are provided on the swivel part such that when one of the workpiece holding parts is positioned in the transfer area, another one of the workpiece holding parts is positioned in the work area, causing a revolution driving part to swivel the swivel part so as to move the workpiece holding parts between the transfer area and the work area; causing the robot to perform a preset work with respect to a workpiece held by the workpiece holding part arranged in the work area; and, during a time period when the robot performs a work with respect to a workpiece held by a workpiece holding part, causing a tilting driving part to tilt the workpiece holding part with respect to the central axis line of the revolution orbit.

Obviously, numerous modifications and variations of the present invention are possible in light of the above teachings. It is therefore to be understood that within the scope of the appended claims, the invention may be practiced otherwise than as specifically described herein.

The invention claimed is:

1. A carrying device, comprising:
   a swivel configured to swivel around a central axis line of a revolution orbit that passes through a workpiece transfer area and a workpiece work area;
   a revolution driver configured to cause the swivel to swivel around the central axis line of the revolution orbit;
   a plurality of workpiece holders positioned on the swivel such that when one of the workpiece holders is positioned in the workpiece transfer area, another one of the workpiece holders is positioned in the workpiece work area; and
   a tilting driver configured to tilt each of the workpiece holders with respect to the central axis line of the revolution orbit and around an axis line perpendicular to the central axis line of the revolution orbit,
   wherein each of the workpiece holders is configured to hold a support jig comprising a support post and configured to hold a workpiece such that the support post of the support jig protrudes from a respective one of the workpiece holders and that a robot works on the workpiece held by the support jig held by the respective one of the workpiece holders in the workpiece work area.

2. The carrying device according to claim 1, wherein the swivel includes a plurality of swivel arms supporting the plurality of workpiece holders, respectively, and the tilting driver includes a plurality of motors and a plurality of transmissions built in the plurality of swivel arms and configured to transmit power of the plurality of motors respectively such that each of the transmissions tilts each of the workpiece holders around the axis line perpendicular to the central axis line of the revolution orbit.

3. The carrying device according to claim 2, further comprising:
   a rotation driver configured to rotate each of the workpiece holders around an axis line perpendicular to the axis line for tilting of the each of the workpiece holders.

4. A robot system, comprising:
   the carrying device of claim 3;
   the robot;
   robot control circuitry configured to cause the robot to perform a preset work with respect to the workpiece held by one of the workpiece holders positioned in the work workpiece area; and
   workpiece posture adjustment circuitry configured to, during a time period when the robot performs the preset work with respect to the workpiece held by the one of the workpiece holders, change a posture of the workpiece by tilting the workpiece holder by instructing the tilting driver.

5. The robot system according to claim 4, wherein during the time period when the robot performs the preset work with respect to the workpiece held by the one of the workpiece holders, the workpiece posture adjustment circuitry is further configured to change the posture of the workpiece by tilting the one of the workpiece holders by instructing the tilting driver and by rotating the one of the workpiece holders by instructing the rotation driver.

6. The robot system according to claim 5, wherein the robot includes a painting tool configured to discharge a coating material and a multi-joint work arm that changes a position and a posture of the painting tool, the robot control circuitry is configured to cause the multi-joint work arm to move the painting tool without pointing the painting tool toward a base of the multi-joint work arm during the time period when the robot performs the preset work with respect to the workpiece held by the one of the workpiece holders, and during a time period when the robot moves the painting tool, the workpiece posture adjustment circuitry is further configured to cause a whole painting target surface of the workpiece to face the painting tool by tilting the one of the workpiece holders by instructing the tilting driver and rotating the one of the workpiece holders by instructing the rotation driver.

7. The robot system according to claim 4 further comprising:
   revolution control circuitry configured to cause the revolution driver to swivel the swivel to move the workpiece holding part between the workpiece transfer area and the workpiece work area; and swivel posture adjustment circuitry configured to, during at least a portion of a time period when the revolution driver swivels the swivel, cause at least one of the workpiece holder to be tilted toward the central axis line side of the revolution orbit by tilting by instructing the tilting driver.

8. The robot system according to claim 7, wherein during at least a portion of a time period when the revolution driver swivels the swivel, the swivel posture adjustment circuitry is further configured to change the posture of the workpiece to avoid an obstacle by rotating the one of the workpiece holders by instructing the rotation driver.

9. A production system, comprising:
the robot system of claim 7; and
a handling robot configured to carry the workpiece and transfer the workpiece to or from the one of the workpiece holders in the workpiece transfer area,
wherein the handling robot includes a transfer holder configured to transfer the workpiece to or from the one of the workpiece holders, and a multi-joint handling arm configured to move the transfer holder, and having a base installed above the carrying device.

10. The production system according to claim 9, wherein the handling arm includes a multi-joint first scalar arm configured to move a front end thereof in a horizontal plane, and a multi-joint second scalar arm connected to the front end of the first scalar arm and configured to move the transfer holder in a vertical plane.

11. The production system according to claim 9, wherein the robot system is installed in a plurality, and the handling robot is installed such that the transfer holder is positioned in workpiece transfer areas of each of a plurality of robot systems.

12. The production system according to claim 11, further comprising:
handling control circuitry configured to cause the handling robot to perform, in different time periods, carrying of the transfer holder to the workpiece transfer area of a first one of the plurality of robot systems and carrying of the transfer holder to the workpiece transfer area of a second one of the plurality of robot systems.

13. The production system according to claim 12, wherein the revolution control circuitry of each of the robot systems is configured to cause the swivel to swivel to position one of the workpiece holders for transfer in the workpiece transfer area in accordance with a timing at which the handling robot positions the transfer holder in the workpiece transfer area.

14. A robot system, comprising:
the carrying device of claim 2;
the robot;
robot control circuitry configured to cause the robot to perform a preset work with respect to the workpiece held by one of the workpiece holders positioned in the work workpiece area; and
workpiece posture adjustment circuitry configured to, during a time period when the robot performs the preset work with respect to the workpiece held by the one of the workpiece holders, change a posture of the workpiece by tilting the workpiece holder by instructing the tilting driver.

15. A robot system, comprising:
the carrying device of claim 1;
the robot;
robot control circuitry configured to cause the robot to perform a preset work with respect to the workpiece held by one of the workpiece holders positioned in the work workpiece area; and
workpiece posture adjustment circuitry configured to, during a time period when the robot performs the preset work with respect to the workpiece held by the one of the workpiece holders, change a posture of the workpiece by tilting the workpiece holder by instructing the tilting driver.

16. A control method for controlling a workpiece, comprising:
causing a revolution driver to swivel a swivel configured to swivel around a central axis line of a revolution orbit that passes through a workpiece transfer area and a workpiece work area such that when one of a plurality of workpiece holders positioned on the swivel is positioned in the workpiece transfer area and another one of the workpiece holders is positioned in the workpiece work area; and
causing a robot to perform work on a workpiece held by the second one of the workpiece holders in the workpiece work area while causing a tilting driver to tilt the second one of the workpiece holders with respect to the central axis line of the revolution orbit and around an axis line perpendicular to the central axis line of the revolution orbit,
wherein the revolution driver of a carrying device is configured to cause the swivel to swivel around the central axis line of the revolution orbit, the plurality of workpiece holders of the carrying device is positioned on the swivel such that when one of the workpiece holders is positioned in the workpiece transfer area, another one of the workpiece holders is positioned in the workpiece work area, the tilting driver of the carrying device is configured to tilt each of the workpiece holders with respect to the central axis line of the revolution orbit and tilt each of the workpiece holders around the axis line perpendicular to the central axis line of the revolution orbit, and each of the workpiece holders is configured to hold a support jig comprising a support post and configured to hold a workpiece such that the support post of the support jig protrudes from a respective one of the workpiece holders and that a robot works on the workpiece held by the support jig held by the respective one of the workpiece holders in the workpiece work area.

17. The control method according to claim 16, further comprising:
during a time period when the robot performs the work with respect to the workpiece held by one of the workpiece holders, causing a rotation driver to rotate the one of the workpiece holders around an axis line perpendicular to an axis line for tilting the one of the workpiece holders.

18. The control method according to claim 17, further comprising:
causing the robot to perform the work in which a multi-joint work arm moves a painting tool without pointing the painting tool toward a base of the multi-joint work arm during the time period when the robot performs the work with respect to the workpiece held by the one of the workpiece holders; and
causing, during a time period when the robot moves the painting tool, a whole painting target surface of the workpiece to face the painting tool by tilting the one of the workpiece holders by the tilting driver and rotating the one of the workpiece holders by the rotation driver, wherein the robot includes the painting tool that discharges a coating material and the multi-joint work arm that changes a position and a posture of the painting tool.

19. The control method according to claim 17, further comprising:

causing the revolution driver to swivel the swivel to move the workpiece holders between the workpiece transfer area and the workpiece work area; and during at least a portion of a time period when the revolution driver swivels the swivel, causing at least one of the workpiece holders to be tilted toward the central axis line side of the revolution orbit by tilting by the tilting driver.

20. The control method according to claim 19, further comprising:

during at least a portion of a time period when the revolution driver swivels the swivel, changing a posture of the workpiece to avoid an obstacle by rotating the workpiece holders by the rotation driver.

* * * * *